United States Patent
Yamada

(10) Patent No.: US 10,558,402 B2
(45) Date of Patent: Feb. 11, 2020

(54) TERMINAL APPARATUS, OPERATION INFORMATION COLLECTION SYSTEM, NON-TRANSITORY COMPUTER-READABLE STORAGE MEDIUM, AND METHOD OF OPERATING TERMINAL APPARATUS

(71) Applicant: SEIKO EPSON CORPORATION, Tokyo (JP)

(72) Inventor: Yusuke Yamada, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/049,894

(22) Filed: Jul. 31, 2018

(65) Prior Publication Data

US 2019/0042167 A1 Feb. 7, 2019

(30) Foreign Application Priority Data

Aug. 2, 2017 (JP) .................................. 2017-150128

(51) Int. Cl.
*G06K 15/00* (2006.01)
*G06F 3/12* (2006.01)

(52) U.S. Cl.
CPC ............ *G06F 3/1207* (2013.01); *G06F 3/126* (2013.01); *G06F 3/1234* (2013.01); *G06F 3/1259* (2013.01); *G06F 3/1292* (2013.01)

(58) Field of Classification Search
CPC .... G06F 3/1207; G06F 3/1234; G06F 3/1237; G06F 3/126
See application file for complete search history.

(56) References Cited

U.S. PATENT DOCUMENTS

| | | | | |
|---|---|---|---|---|
| 6,906,815 B1* | 6/2005 | Miyake | .................. | G06F 3/1207 358/1.14 |
| 2009/0077239 A1* | 3/2009 | Kaneko | .................... | H04L 41/06 709/227 |
| 2010/0238501 A1* | 9/2010 | Fujimaki | ............... | G06F 21/608 358/1.15 |
| 2010/0315907 A1* | 12/2010 | Tanabe | .................. | G04G 9/0064 368/47 |
| 2011/0242557 A1* | 10/2011 | Sato | ....................... | G06F 3/1207 358/1.9 |
| 2015/0254027 A1* | 9/2015 | Cecile | .................... | G06F 3/1204 358/1.15 |
| 2016/0306596 A1* | 10/2016 | Yasuda | .................. | G06F 3/1226 |

FOREIGN PATENT DOCUMENTS

JP 2008-242564 A 10/2008

* cited by examiner

*Primary Examiner* — Moustapha Diaby
(74) *Attorney, Agent, or Firm* — Workman Nydegger

(57) ABSTRACT

A terminal apparatus is communicatively connected to a server system that collects operation information on a printer, through a network, the terminal apparatus including a communication interface that receives printing time information, a display, and a processor that performs processing which displays information that is based on the printing time information. The processor causes a mode for displaying the printing time information on the display to change between a first state where the reception of the printing time information from the server system succeeds and a second state that is at least one of a state where the reception fails and a state where the reception is in progress.

12 Claims, 14 Drawing Sheets

FIG. 6

| TYPE | ADDRESS | OPERATION INFORMATION |
|---|---|---|
| ELAPSED TIME FROM POWERING-ON | a1 | v1 |
| AMOUNT OF CONSUMED Y INK | a2 | v2 |
| AMOUNT OF CONSUMED M INK | a3 | v3 |
| AMOUNT OF CONSUMED C INK | a4 | v4 |
| AMOUNT OF CONSUMED K INK | a5 | v5 |
| ACCUMULATION NUMBER OF ROTATIONS OF ROLLER | a6 | v6 |
| ⋮ | ⋮ | ⋮ |

FIG. 7

| ACQUISITION DATE | PRINTER IDENTIFICATION INFORMATION | OPERATION INFORMATION |
|---|---|---|
| t1 | id1 | ... |
| t2 | id1 | ... |
| t3 | id3 | ... |
| t4 | id2 | ... |
| t5 | id5 | ... |
| t6 | id2 | ... |
| ⋮ | ⋮ | ⋮ |

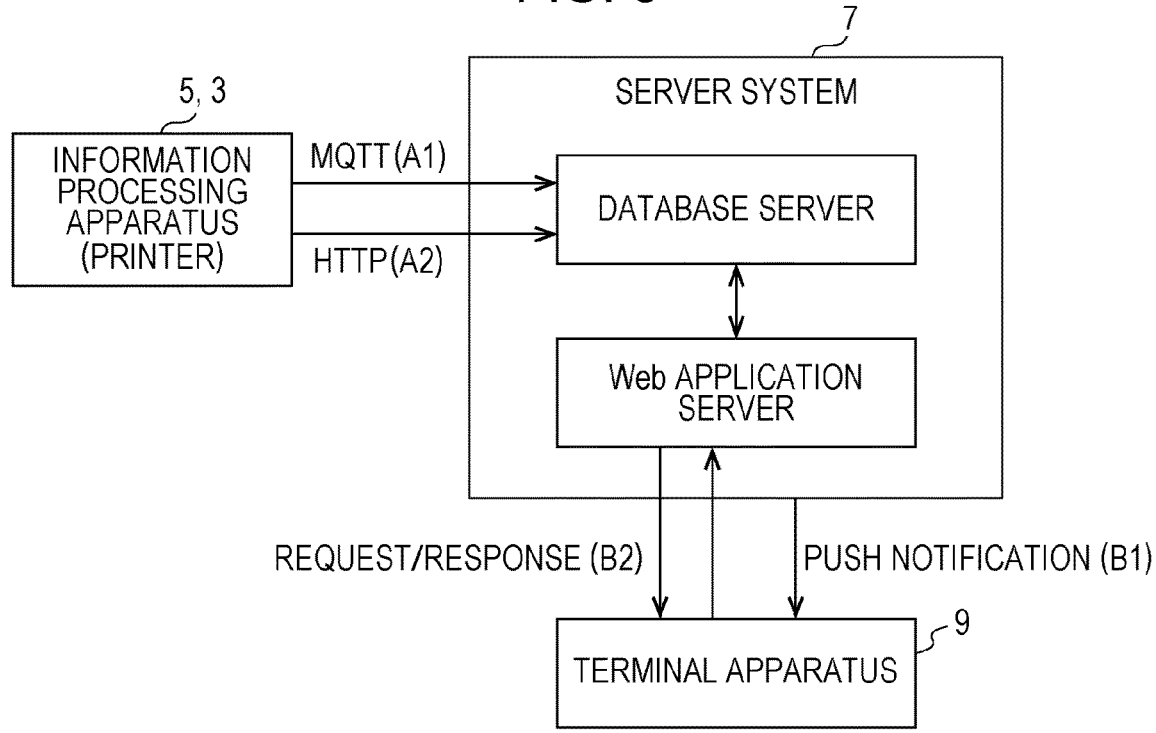

TERMINAL APPARATUS, OPERATION INFORMATION COLLECTION SYSTEM, NON-TRANSITORY COMPUTER-READABLE STORAGE MEDIUM, AND METHOD OF OPERATING TERMINAL APPARATUS

CROSS-REFERENCE TO RELATED APPLICATIONS

The present application claims priority to Japanese Patent Application No. 2017-150128, filed Aug. 2, 2017, which is hereby incorporated by reference in its entirety.

BACKGROUND

1. Technical Field

The present invention relates to a terminal apparatus, an operation information collection system, a non-transitory computer-readable storage medium, and a method of operating the terminal apparatus.

2. Related Art

In the related art, a server system is known that is connected to a network and collects pieces of operation information on a plurality of pieces of equipment. It is considered that there are also various types of equipment, pieces of operation information on which are targets for collection, and for example, there is production equipment such as a printer.

It is considered that there are many uses of the operation information that is collected by the server system. For example, the server system transmits the collected operation information to a terminal apparatus that is used by a user. When this is done, it is possible that the user checks an operation state of a printer using the terminal apparatus. For example, it is also possible that the user who stays at a place that is located far from the printer monitors the operation state (for example, a state of progress in performing a job) of the printer remotely.

In JP-A-2008-242564, there are disclosed a technique in which a standard for a length of the time it takes from the time a request for processing a job is made to an image processing apparatus until processing starts in the image processing apparatus is displayed on a display of a terminal that is connected to the image processing apparatus through a network and a technique in which a display mode changes with a length of waiting time.

The server system and the terminal apparatus are connected to each other through the network. For this reason, when displaying is performed in the terminal apparatus, there is also a need to take into consideration that a network connection to the network is released. However, in a technique in JP-A-2008-242564, when the network connection to the image processing apparatus is released, the displaying is not taken into consideration. First of all, in the technique in JP-A-2008-242564, a standard for a time to starting of printing can be checked, but a time to completion of printing cannot be checked. In other words, in JP-A-2008-242564, an estimated waiting time in a printer driver that results when a job is assigned is displayed, but monitoring of progress after the assignment of the job is not performed.

SUMMARY

An advantage of some aspects of the invention is to provide a terminal apparatus, an operation information collection system, a non-transitory computer-readable storage medium, and a method of operating the terminal apparatus, which perform suitable displaying even in a case where information from a server system cannot receive or the reception is in progress, when the displaying that is based on operation information which is collected in the server system.

According to an aspect of the invention, there is provided a terminal apparatus that is communicatively connected to a server system that collects operation information on at least one printer, through a network, the apparatus including: a communication interface that receives printing time information which indicates a time to completion of printing by the printer or a printing completion time, through the network, a display; and a processor that performs processing which displays information that is based on the printing time information, on the display, in which the processor causes a mode for displaying the printing time information on the display to change between a first state where the reception of the printing time information from the server system through the network succeeds and a second state that is at least one of a state where the reception fails and a state where the reception is in progress.

In this case, in the terminal apparatus that receives the printing time information from the server system that collects the operation information on the printer, the processor of the terminal apparatus performs processing that changes a mode for displaying, depending on a reception situation. By using the terminal apparatus, it is possible that a user checks an operation state of the printer from a place that is located far from the printer, but a situation also occurs in which the terminal apparatus cannot receive the printing time information because disconnection from the network takes place. According to the aspect of the invention, it is possible that the terminal apparatus performs suitable displaying even in the case where the printing time information cannot be received or where the reception is in progress.

In the terminal apparatus, in the second state, the processor may perform processing that displays information that is based on the printing time information of which the reception succeeds in the first state that is earlier than the second state, on the display.

In the case, the information that is based on the past printing time information is displayed in this manner on the display, and thus, it is possible that suitable information is presented to the user.

In the terminal apparatus, in the second state, the processor may perform processing that displays printing completion time information that is based on the printing time information of which the reception succeeds in the first state that is earlier than the second state, on the display.

In this case, the printing completion time information that is based on the past printing time information is displayed in this manner on the display, and thus, it is possible that an estimated time for the completion of the printing is presented to the user.

In the terminal apparatus, in the second state, the processor may perform processing that displays information that is a remaining time to the completion of the printing, which is based on the printing time information of which the reception succeeds in the first state that is earlier than the second state, on the display.

In this case, the remaining-time information that is based on the past printing time information is displayed in this manner on the display, and thus, it is possible that an estimated remaining time to the completion of the printing is presented to the user.

In the terminal apparatus, in the second state, the processor may perform counting-down processing of the remaining-time information that is the information, which is based on clocking information from a timer, and perform processing that displays the remaining-time information that goes through the counting-down processing, on the display.

In this case, the remaining-time information is updated in accordance with the passage of time, and thus, it is possible that suitable remaining-time information is presented to the user.

In terminal apparatus, in the second state, the processor may perform processing that displays warning information indicating an abnormality in the connection to the server system, on the display.

In this case, when this is done, it is possible that the fact that an abnormality in the connection occurs is made clear to the user.

In the terminal apparatus, in the second state, the processor may perform processing that displays time information which indicates the latest timing at which the reception of the printing time information from the server system through the network succeeds, on the display.

In this case, when this is done, it is possible that what time information, on which the displaying on the display is based, relates to is made clear to the user.

In the terminal apparatus, (1) the communication interface may receive printing completion time information, as the printing time information, from the server system, and the processor may perform processing that displays the printing completion time information on the display or processing that displays information which is a remaining time to the completion of the printing, which is obtained based on the printing completion time information, on the display, or (2) the communication interface may receive the information that is the remaining time, as the printing time information, from the server system, and the processor may perform processing that displays the information which is the remaining time, on the display or processing that displays the printing completion time information which is obtained based on the information which that is the remaining time, on the display.

In this case, when this is done, it is possible that various types of Information are used as pieces of information that are received by the terminal apparatus from the server system, and as pieces of information that are displayed on the display.

In the terminal apparatus, in a case where, among first to N-th (N is an integer that is equal to or greater than 2) timings, the reception of the printing time information succeeds in the first timing, where the reception of the printing time information fails in the second to (N−1)-th timings, and where the reception of the printing time information succeeds in the N-th timing, the processor may perform processing that displays information which is based on the printing time information, which is received at the first timing, and warning information indicating an abnormality in the connection to the server system, on the display, during a period that corresponds to the second to (N−1)-th timings, and the processor may perform processing that displays information which is based on the printing time information that is received at the N-th timing, on the display and processing that sets the warning information not to be displayed, at the N-th timing.

In this case, when this is done, it is possible that, according to a result of the reception at each timing, information at a suitable timing is used, and thus, processing for the displaying on the display is performed.

In the terminal apparatus, the communication interface may receive pieces of printing time information on a plurality of the printers through the network, and the processor may perform processing that displays a display screen, within one screen of which the pieces of printing time information on the plurality of the printers are arranged, on the display.

In this case, when this is done, it is possible that pieces of operation information on a plurality of printers are displayed on the display in a more perspicuous manner.

In the terminal apparatus, among the plurality of the printers on which the pieces of printing time information are displayed, the processor may perform processing that enlarges a display area for the printer on which a selection operation is performed and thus that displays detail information.

In this case, when this is done, in a case where pieces of operation information on the plurality of the printers are set to be display targets, it is also possible that detail information on a given printer is suitably displayed.

According to another aspect of the invention, there is provided a terminal apparatus that is communicatively connected to a server system that collects operation information on at least one piece of equipment, operation information on which is a target for collection, through a network, the apparatus including: a communication interface that receives job completion time information which indicates a time to completion of a job that is performed in the equipment, the operation information on which is the target for collection, or a job completion time, through the network; a display; and a processor that performs processing which displays information that is based on the job completion time information, on the display, in which the processor causes a mode for displaying the job completion time information to change between a first state where the reception of the job completion time information from the server system through the network succeeds and a second state that is at least one of a state where the reception fails and a state where the reception is in progress.

According to still another aspect of the invention, there is provided an operation information collection system including any terminal apparatus described above and the server system.

According to still another aspect of the invention, there is a non-transitory computer-readable storage medium on which a program that causes a terminal apparatus that is communicatively connected to a server system that collects operation information on at least one printer, through a network, to operate, the program causing the terminal apparatus to serve as: a communication interface that receives printing time information which indicates a time to completion of printing by the printer or a printing completion time, through the network; and a processor that performs processing which displays information that is based on the printing time information, on a display, in which the processor causes a mode for displaying the printing time information on the display to change between a first state where the reception of the printing time information from the server system through the network succeeds and a second state that is at least one of a state where the reception fails and a state where the reception is in progress.

According to still another aspect of the invention, there is provided a method of operating a terminal apparatus that is communicatively connected to a server system that collects operation information on at least one printer, through a network, the method including: performing processing that receives printing time information which indicates a time to completion of printing by the printer or a printing completion time, through the network; performing processing that displays information which is based on the printing time information, on a display; and causing a mode for displaying the printing time information on the display to change between a first state where the reception of the printing time information from the server system through the network succeeds and a second state that is at least one of a state where the reception fails and a state where the reception is in progress.

BRIEF DESCRIPTION OF THE DRAWINGS

The invention will be described with reference to the accompanying drawings, wherein like numbers reference like elements.

FIG. 6 is an example of a data structure of operation information that is stored in the printer.

FIG. 7 is an example of the data structure of the operation information that is stored in the information processing apparatus or the like.

FIG. 8 is a schematic diagram of a communication mode between the information processing apparatus, the server system, and the terminal apparatus.

FIG. 9 is a specific example of first information.

DESCRIPTION OF EXEMPLARY EMBODIMENTS

The present embodiment will be described below. It is noted that the present embodiment which will be described below does not improperly limit the subject matter of the invention that is stated by a claim. Furthermore, all configurations that will be described in the present embodiment are not limited to being configurational requirements for the invention.

Furthermore, an example in which equipment, operation information on which is a target for collection, is a printer (a printing apparatus) is described below, but it is possible that the equipment, the operation information on which is the target for collection includes other equipment (for example, production equipment other than the printer).

1. Operation Information Collection System

Figure 1:
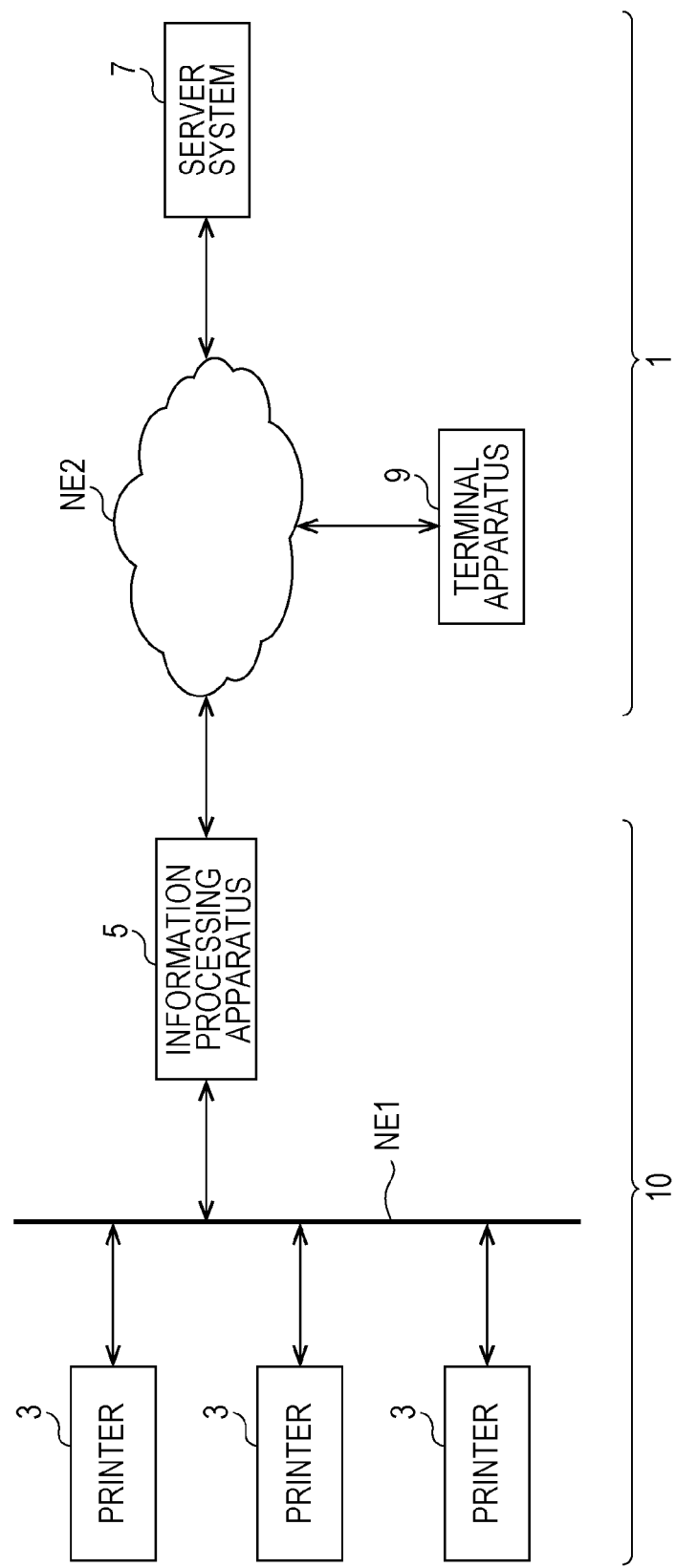
FIG. 1 is a configurational example of an operation information collection system.

FIG. 1 is a diagram that schematically illustrates an example of an operation information collection system according to the invention. The operation information collection system 1 includes a server system 7 that collects operation information on a printer 3 through an information processing apparatus 5, and the terminal apparatus 9. The server system 7 transmits the collected operation information to the terminal apparatus 9. It is noted that all pieces of operation information, which are collected by the server system 7, do not need to be pieces of information that are targets for transmission to the terminal apparatus 9. For example, the server system 7 may transmit information that results from extracting a portion of the operation information, or information that results from process processing, such as statistical processing, on the operation information, to the terminal apparatus 9. The terminal apparatus 9 displays the information, which is received from the server system 7, on the display, or performs reporting by making a rumbling sound or the like.

However, a system that includes the operation information collection system 1 is not limited to a configuration in FIG. 1, and various modifications are possible such as omission of one or several constituent elements in the configuration and addition of other constituent elements. For example, the information processing apparatus 5 is omitted from FIG. 1, and each printer 3 may be connected directly to a network NE2 (the Internet).

As illustrated in FIG. 1, a plurality of printers 3 and the information processing apparatus 5 are connected to the network NE1, and possibly communicate bidirectionally with each other through the network NE1. Furthermore, the information processing apparatus 5 and the server system 7 are connected to the network NE2, and possibly communicate with each other through the network NE2. Furthermore, the terminal apparatus 9 is also connected to the network NE2, and the server system 7 and the terminal apparatus 9 possibly communicate bidirectionally with each other through the network NE2.

For example, a network NE1 is a local area network (LAN), and the network NE2 is the Internet. However, the LAN or the Internet is one that is illustrated as an example of a communication network, and thus a specific configuration for connecting between the printer 3 and the information processing apparatus 5, between the information processing apparatus 5 and the server system 7, and between the server system 7 and the terminal apparatus 9 is not limited to these.

A system 10 that is configured with the plurality of printers 3 and the LAN, and the information processing apparatus 5 collects the operation information on each printer 3 using the information processing apparatus 5, and transmits the collected pieces of operation information to an external server system 7. The information processing apparatus 5, for example, is an apparatus that is set up within a facility of the same company, and may be a personal computer (PC) or may be a server within a company. It is noted that one system 10 is illustrated in FIG. 1, but that a plurality of system 10 may be connected to the server system 7.

The printer 3 includes a display 333, as will be described below with reference to FIG. 2. For this reason, if a user performs a job near the printer 3, and it is possible that the user recognizes a state of the printer by browsing through the operation information that is displayed on the display 333. However, it is also considered that the user performs a job at a place distant from the printer 3.

For example, in a small- or middle-scale company (office) for which a small number of employees work, in addition to operating the printer 3, the user needs to perform tasks, such as accounting, sales, and product delivery, and a situation where the user performs a job at a place distant from the printer 3 takes place. For this reason, it is important to set up a system in which an operation state of the printer 3 can be checked using the terminal apparatus 9 that is operated by the user. Specifically, the terminal apparatus 9 receives, displays, and reports information that is based on the operation information which is collected by the server system 7, and the user performs remote monitoring of the operation state of the printer 3.

Furthermore, in the case of a comparatively large-scaled office, it is possible that a person is assigned to each printer 3 (each production line). However, a manager who controls a plurality of production lines in general cannot always check the displays 333 of all printers 3. For this reason, in order to suitably know overall progress in performing a job, it is important to display information with the terminal apparatus 9, and in this case, the operation information collection system 1 that is illustrated in FIG. 1 is also useful.

It is noted that one terminal apparatus 9 is illustrated in FIG. 1, but that a plurality of terminal apparatuses 9 may be present. For example, a plurality of users within a company that uses one system 10 may perform the reception and browsing-through of information by terminal apparatuses 9 of the plurality of users.

Furthermore, in a case where a plurality of systems 10 are connected to the server system 7, one or more terminal apparatus 9 may be used for each system 10.

2. Detailed Configurational Example of Each Apparatus

Next, a configurational example of each of the printer 3, the information processing apparatus 5, the server system 7, and the terminal apparatus 9 will be described.

2.1 Printer

Figure 2:
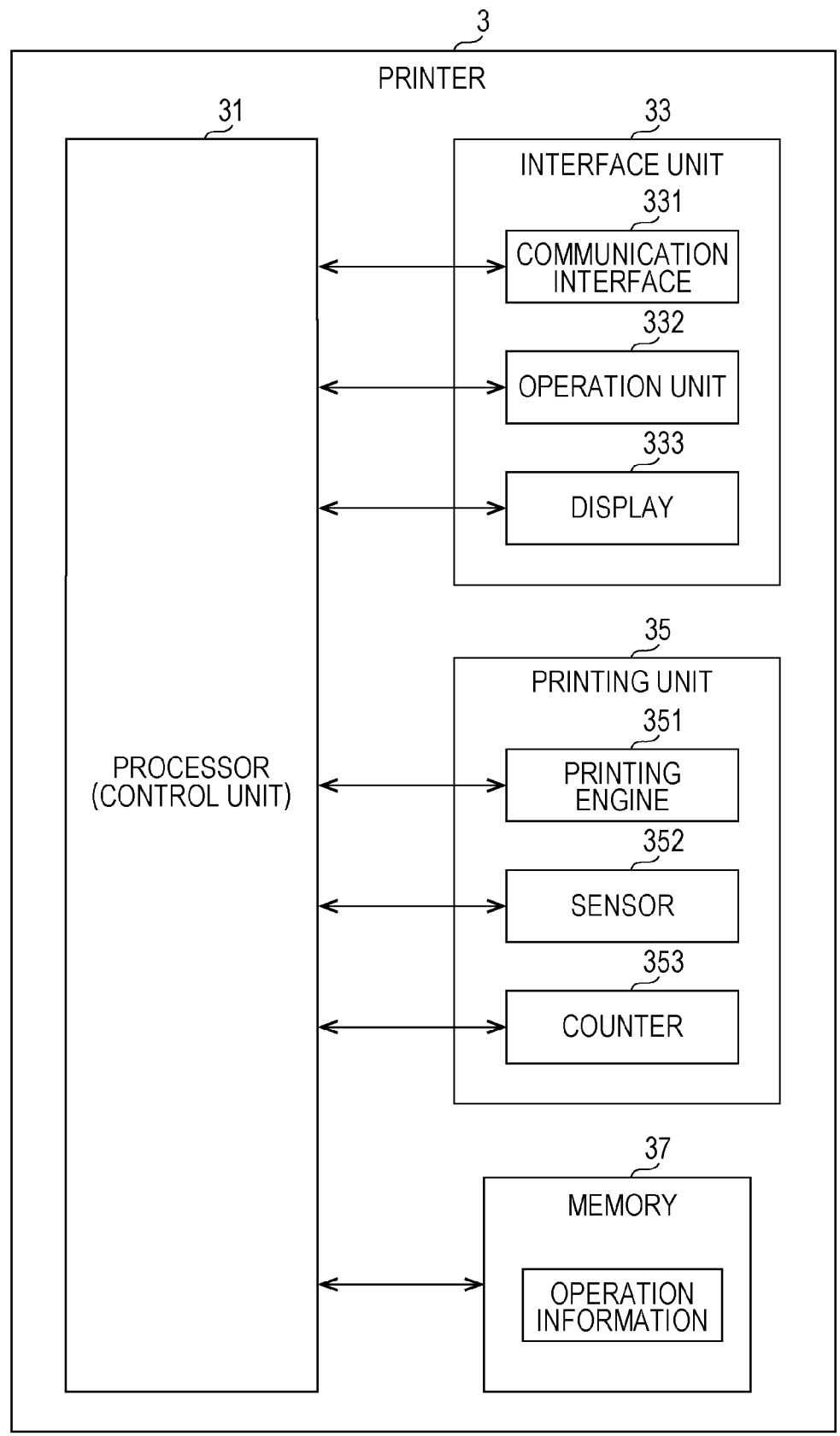
FIG. 2 is a configurational example of a printer.

FIG. 2 is a block diagram illustrating an example of a configuration of the printer 3. The printer 3 includes a processor 31, an interface unit 33, a printing unit 35, and a memory 37. The processor 31 controls in an integrated manner an operation that is performed in the printer 3. A function of the processor 31 can be realized by various processors such as a central processing unit (CPU), hardware such as application specific integrated circuit (ASIC) (a gate array or the like), a program, or the like. The interface unit 33, the printing unit 35, and the memory 37 operate under the control of the processor 31.

The interface unit 33 includes a communication interface 331, an operation unit 332, and the display 333. The communication interface 331 is connected to a LAN, and performs communication with the information processing apparatus 5 through the LAN. Furthermore, the operation unit 332 is configured with a button or the like on which an input operation from the user is applied, and the display 333 is configured with a display or the like on which various pieces of information relating to the printer 3 are displayed for the user. It is noted that the operation unit 332 and the display 333, for example, may be configured to be integrated with a touch panel.

The printing unit 35 includes a printing engine 351, a sensor 352, and a counter 353. The printing engine 351 is mechanically configured to perform printing of an image on a printing medium. The printing engine 351 discharges ink from an ink jet-type discharge head to a winding-type printing medium that is transported with rollers in tow, and thus printers an image on the printing medium. It is noted that a specific configuration of the printing engine 351 is not limited to one that is described here and that the printing engine 351 may perform printing on a paper sheet-type printing medium and may perform printing with a toner using a laser method. The sensor 352 detects various physical quantities associated with an operation state of the printing engine 351, and the counter 353 counts various numerical values that change according to operation of the printing engine 351.

As physical quantity illustrating the operation state of the printing engine 351, for example, a voltage that is applied to an electrical component of the printing engine 351, temperature and humidity within the printing engine 351, a position of the discharge head or the printing medium, and the like. In order to detect these physical quantities, various sensors 352 are provided such a voltage sensor, a temperature and humidity sensor, a position sensor, an acceleration sensor, and the like. Furthermore, as numerical values that change according to the operation of the printing engine 351, for example, there are a time that elapsed after the printing engine 351 is powered on, the accumulation sum of lengths of the printing media on which the printing is performed, an amount of consumed ink (or a remaining amount of ink), the accumulation number of rotations of a mechanical component (for example, a roller that transports the printing medium) and the like. Then, in order to count these numerical values, various counters 353 are provided.

The memory 37 is configured with a storage medium such as a hard disk drive (HDD), a read only memory (ROM), or a random access memory (RAM). Stored in the memory 37 is status information (an error, a warning, or the like) on the printer 3, identification information (a job name) on a job that is performed in the printer 3, information (printing time information or progress information) indicating progress in performing a job, data that is output from the sensor 352 and the counter 353, or the like, as the operation information indicating an operation situation of the printer 3.

2.2 Information Processing Apparatus

Figure 3:
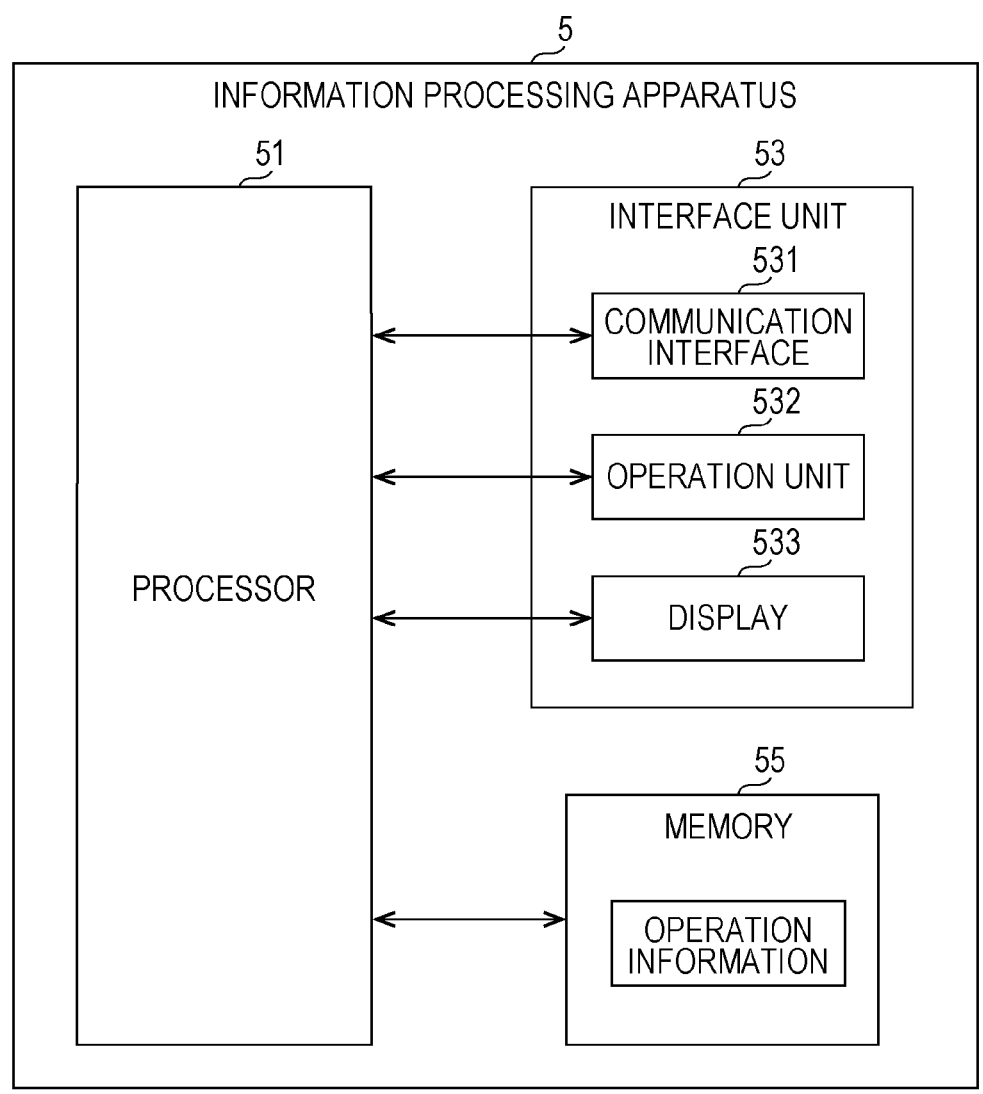
FIG. 3 is a configurational example of an information processing apparatus.

FIG. 3 is a block diagram illustrating an example of a configuration of the information processing apparatus 5. The information processing apparatus 5 includes a processor 51, an interface unit 53, and a memory 55, accesses the memory 37 of each of the plurality of printers 3 to collect the operation information, and performs an information relay operation of transmitting the collected operation information to the server system 7. The processor 51 is a processor such as a CPU, and performs the information relay operation using the interface unit 53 and the memory 55.

The interface unit 53 includes a communication interface 531, an operation unit 532, and a display 533. The communication interface 531 is connected to the LAN and the Internet. The communication interface 531 performs communication with each printer 3 through the LAN and, along with this, performs communication with the server system 7 through the Internet. Furthermore, the operation unit 532 is configured with a mouse, a keyboard, or the like on which the input operation from the user is applied, and the display 533 is configured with a display or the like on which various pieces of information are displayed for the user. It is noted that the operation unit 532 and the display 533, for example, may be configured to be integrated with a touch panel.

The memory 55 is configured with a storage medium, such as a HDD, a ROM, a RAM. The operation information that is received by the communication interface 531 from the printer 3 is stored in the memory 55. The information processing apparatus 5 is one that acquires pieces of operation information from a plurality of printers 3. Because of this, identification information (a printer ID) on the printer 3, and pieces of information such as the status information described above are stored in the memory 55 in a state of being associated with each other.

2.3 Server System

Figure 4:
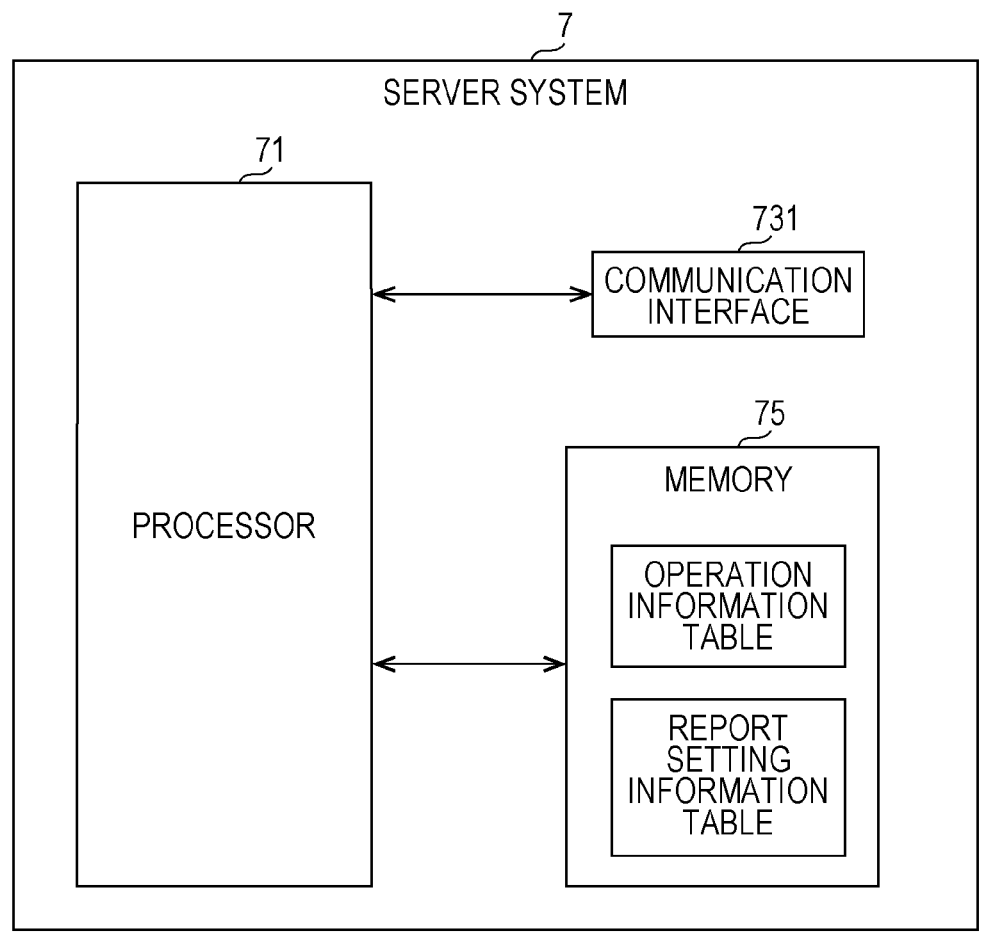
FIG. 4 is a configurational example of a server system.

FIG. 4 is a block diagram illustrating an example of a configuration of the server system 7. The server system 7 includes a processor 71 (a processor), a communication interface 731 (a communication unit), and a memory 75 (a storage device). The server system 7 receives the operation information that is collected by the information processing apparatus 5, and along with this, transmits the operation information to the terminal apparatus 9. A function of the processor 71 can be realized by various processors such as a CPU, hardware such as an ASIC, a program, or the like, and the processor 71 performs a prescribed operation using the communication interface 731 and the memory 75.

The communication interface 731 is connected to the Internet, and the communication with the information processing apparatus 5 or the terminal apparatus 9 is performed through the Internet. It is noted that the server system 7 may include an operation unit or a display that is not illustrated. The operation unit is configured with a mouse, a keyboard, or the like on which the input operation from the user is applied, and the display is configured with a display or the like on which various pieces of information are displayed for the user. However, the server system 7 may perform management of the server system 7 using an external apparatus (a terminal apparatus for management) without including the operation unit and the display. For example, the server system 7 may function as a Web server, in a mode where the server system 7 operates using software (a web browser) which runs on an external apparatus and where various pieces of information are displayed on a display of the external apparatus.

The memory 75 is configured with a storage medium, such as a HDD, a ROM, or a RAM. The operation information from the printer 3 and report setting information are stored in the memory 75. The memory 75 may be a database (a relational database in a narrow sense), and an operation information table and a report setting information table are stored in the memory 75. The operation information table is a table in which the operation information is stored. The report setting information table is a table that is used in a case where push notification is performed on the terminal apparatus 9. The push notification here refers to a communication type in which transmission of information from the transmitting side is performed although a request from the receiving side is not present. The push notification from the server system 7 to the terminal apparatus 9 is the transmission of information to the terminal apparatus 9 with the server system 7 being a source.

It is noted that the server system 7 is not limited to one that is realized as one server. For example, the server system 7 may include a database server (the memory 75) in which the operation information table or the like is stored, and an application server (one of the processor 71 and the communication interface 731) that performs transmission and reception of information to and from the terminal apparatus 9. Alternatively, the server system 7 may include a server for load distribution or a server for the push notification to the terminal apparatus 9. Moreover, the database server or the application server, or the like may be realized by an operation of performing distribution to a plurality of servers. Furthermore, each server that makes up the server system 7 may be a server (a virtual server) that is virtualized. In this case, each virtual server may operate on the same server (the same physical server), and may operate on a different physical server. Furthermore, dynamic scheduling (for example, a dynamic change in the number of virtual servers) may be performed on the server system 7 by monitoring a communication load or the like. That is, various modifications to the server system 7 according to the present embodiment are possible in terms of the number of physical servers, the number of virtual servers in a case where the servers are virtualized, a correspondence between a virtual server and a physical server, or the like.

2.4 Terminal Apparatus

Figure 5:
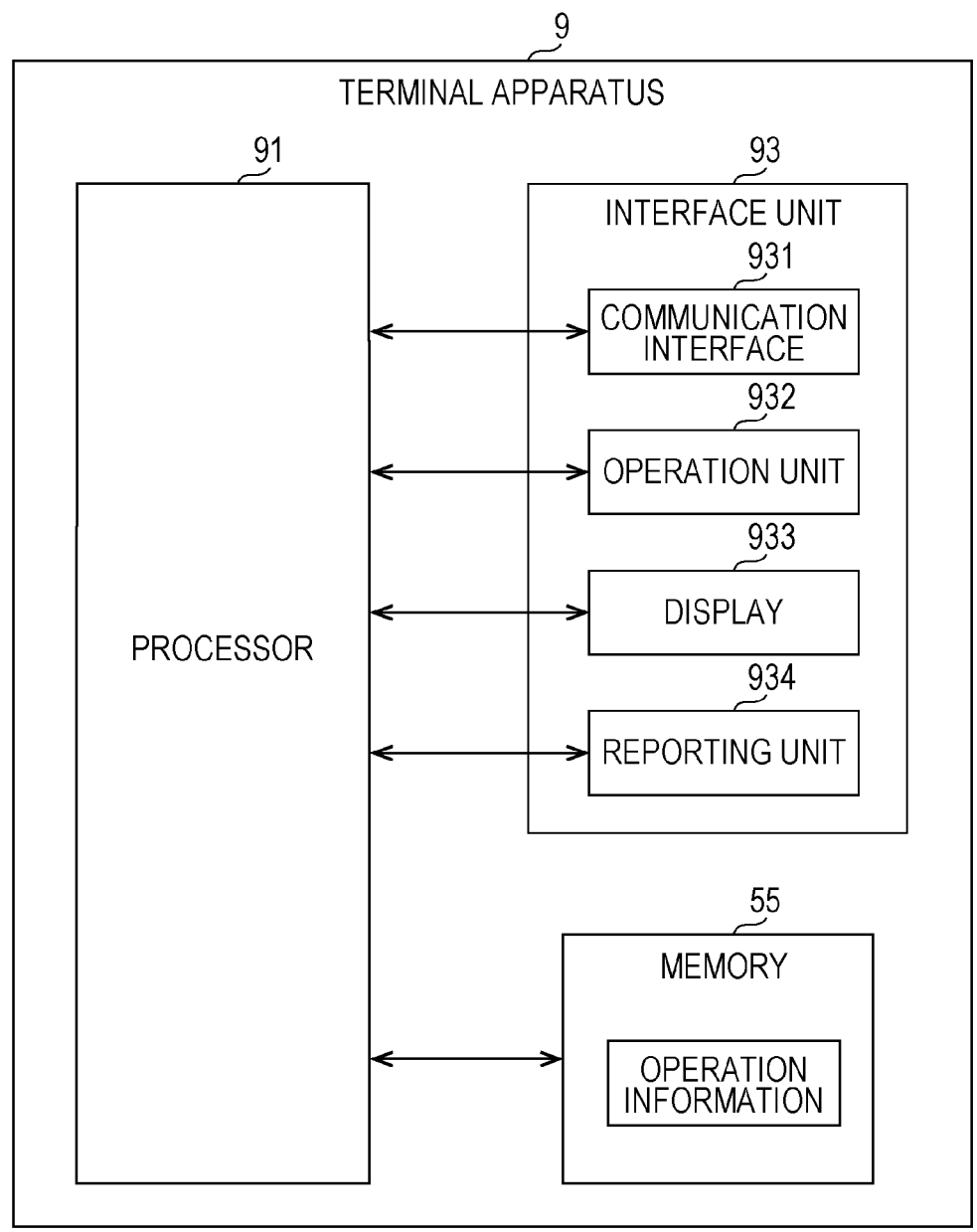
FIG. 5 is a configurational example of a terminal apparatus.

FIG. 5 is a block diagram illustrating an example of a configuration of the terminal apparatus 9. The terminal apparatus 9 includes a processor 91 (a processor), an interface unit 93, and a memory 95 (a storage device) and receives the operation information that is collected by the server system 7. A function of the processor 91 can be realized by various processors such as a CPU, hardware such as an ASIC, a program, or the like.

The interface unit 93 includes a communication interface 931, an operation unit 932, a display 933, and a reporting unit 934. The communication interface 931 is connected to the Internet and performs the communication with the server system 7 through the Internet. The operation unit 932 is configured with a button or the like on which the input operation from the user is applied, and the display 933 is configured with a display or the like on which various pieces of information are displayed for the user. It is noted that the operation unit 932 and the display 933, for example, may be configured to be integrated with a touch panel. The reporting unit 934 performs reporting to the user. The reporting unit 934 may be, for example, a speaker that performs reporting using audio, may be a vibration (a vibration motor) that performs reporting using vibration, and may be a combination of these.

The memory 95 is configured with a storage medium, such as a HDD, a ROM, or a RAM. Stored in the memory 95 may be software (an application) that performs acquisition processing, display processing, or the like of the operation information from the server system 7. Furthermore, the operation information that is received from the server system 7 is stored in the memory 95.

3. Communication of the Operation Information

Next, a technique of transmitting and receiving the operation information between each of the apparatuses that are illustrated in FIGS. 1 to 5 will be described above.

3.1 Communication Between the Printer and the Information Processing Apparatus

FIG. 6 is a diagram that schematically illustrates an aspect of storage of the operation information in the memory 37 of the printer 3. As illustrated in FIG. 6, in the memory 37, a type of operation information and a memory address are associated with each other, and each piece of operation information is stored in an address that corresponds to a type thereof. In the given specific example, operation information v1 indicating a value of the elapsed time from powering-off is stored in an address a1 that corresponds to a type thereof. However, modifications are possible such as when the operation information and an update time (a time stamp) for the operation information are stored in the memory 37 in a state of being associated with each other.

The processor 31 or the printing unit 35 (the sensor 352 or the counter 353) of the printer 3 periodically (at all times in a narrow sense) monitors the operation state, and in a case where the operation state changes, the operation information on the memory 37 is updated.

The processor 51 (the communication interface 531) of the information processing apparatus 5 performs polling, and periodically acquires the operation information from one or more printers 3 that are connected through the LAN.

If there is a case where, as illustrated in FIG. 6, in the memory 37 of the printer 3, the type and the address of the operation information are associated with each other, the processor 51 accesses the address that corresponds to the operation information which is a target for collection, and collects the operation information that is stored in the address. For example, the processor 51 sets previously-collected information, which undergoes a change, to be a target of collection. Alternatively, based on a mode, a firmware version, or the like, of the printer 3, the processor 51 determines the operation information on every printer 3, which is a target for collection.

FIG. 7 is a diagram that schematically illustrates an aspect of storage of the operation information in the memory 55 of the information processing apparatus 5. As illustrated in FIG. 7, the operation information is stored in the memory 55 in a state of being associated with the identification information (an ID or a serial number) on the printer 3 and acquisition time information. It is noted that in the same manner as in the example in FIG. 6, a combination of a type of information ("an amount of consumed Y ink," or the like) and a specific value (the number of times of discharge, a volume, a ratio, or the like in the case of an amount of consumed ink), although omitted in FIG. 7, is stored as the operation information in the memory 55.

3.2 Communication Between the Information Processing Apparatus and the Server System FIG. 8 is a diagram that schematically illustrates an aspect of communication between the information processing apparatus 5 (the printer 3), the server system 7, and the terminal apparatus 9. The server system 7 receives the operation information that is transmitted from the information processing apparatus 5, and stores the received operation information in the operation information table of the memory 75. The communication interface 731 of the server system 7 receives the operation information from the information processing apparatus 5 (or directly from the printer 3) by performing a plurality of communication processing operations. For example, the communication interface 731 performs first communication processing that maintains an established state of communication connection after establishment of the communication connection, and second communication processing that releases the communication connection when information is received after the establishment of the communication connection. The first communication processing is communication processing that, for example, uses a message queueing telemetry transport (MQTT), and the second communication processing that, for example, uses a hypertext transfer protocol (HTTP). It is noted that the communication interface 731 (along with the communication interface 531 and the communication interface 931) may realize the first communication processing and the second communication processing through a secure connection that uses a secure sockets layer (SSL) or the like.

The communication interface 731, as indicated by A1 in FIG. 8, receives first information that is the operation information which has a high-real time attribute, by performing the first communication processing. The first information, for example, is information indicating a status (a status change) of the printer 3. In a case where the printer 3 proceeds from a normal operation state (printing in progress) to a warning state or an error state, in order to continue or resume a job (printing), there is a strong need for the user to return to the printer 3 and perform a certain job. The warning state is a state (for example, a state where a remaining amount of ink decreases and so forth) in which there is a concern that the printing will not be continued, and the error state refers to a state where a printing operation is interrupted due to a certain abnormality. Alternatively, in a case where a job is ended in the printer 3 and proceeding from the normal operation state (printing in progress) to an idle state (on standby) takes place, it is possible that the user returns to a place where the printer 3 is installed and then causes the printer 3 to efficiently operate by assigning a new job. Consequently, a status change from printing in progress to being on standby is also information that has a high-real time attribute.

Consequently, it is desirable that information indicating the status change is transmitted to the server system 7 (and the terminal apparatus 9) as earlier as possible after the status change in the printer 3 occurs. Consequently, in a case where an event indicating the status change occurs, for example, the communication interface 531 (or the communication interface 331 of the printer 3) of the information processing apparatus 5 performs transmission of the operation information, which is triggered by the occurrence of the event (which is caused by an event trigger), to the server system 7 using MQTT.

Specifically, in a case where an event occurs, the communication interface 531 (the communication interface 331) transmits the operation information to the server system 7 immediately (in real time). When this is done, it is possible that the server system 7 suitably receives information that has a high-real time attribute.

FIG. 9 is a specific example of the first information among pieces of operation information, and is a specific example of an event that corresponds to each piece of information. As the first information, in addition to the status information, remaining-time information indicating remaining time to job completion, information, such as a quantity of consumed consumable materials (liquid ink or toner, or a printing medium such as a paper sheet or a piece of cloth) or a remaining amount of consumable material, and information, such as a name of a job that is performed in the printer 3 are considered.

As illustrated in FIG. 9, the status information is a value of any one of "printing in progress," "being on standby," "being in a warning state," and "being in error." "Printing in progress" corresponds to the normal operation state described above, "being on standby" corresponds to the idle state, "warning in progress" corresponds to a warning state, and "being in error" corresponds to an error state. Then, an event that triggers the transmission of the status information to the server system 7 is an event in which a value of the status information changes. It is noted that pieces of equipment, that is, the printer 3, the information processing apparatus 5, and the server system 7 may be managed with transitioning to "warning in progress" or "being in error" and transitioning to "printing in progress," or "being on standby" being separated as different events. While the former is an event indicating an abnormal state where operation of the printer 3 stops or where there is a concern that the operation of the printer 3 will stop, the latter is an event indicating a starting point or an ending point in normal operations such as printing starting and ending.

The remaining-time information is information indicating remaining time to printing completion, and for example, is information indicating remaining hours and minutes. Instead of the remaining-time information, printing completion time information indicating a printing completion time may be set to be first information. The event that triggers the transmission of the remaining-time information to the server system 7 is an event in which the remaining-time information changes. For example, in a case where a flushing operation occurs while the printing is in progress and where the remaining time increases, the printer 3 or the information processing apparatus 5 determines that an event occurs.

The information that is the remaining quantity of consumable materials is a remaining quantity of printing media. The remaining amount of ink is a ratio of a remaining amount to a full capacity of an ink tank which is assumed to be 100%, and a unit of the remaining amount is a percentage. The remaining quantity of printing media may be, for example, the number of sheets, and, in a case where a rolled sheet or the like is used, may be a length (unit: m). An event that triggers transmission of the information that is the remaining quantity of consumable materials to the server system 7 may be an event in which the remaining quantity changes by only a prescribed quantity (a prescribed ratio, a prescribed number of sheets, or a prescribed length), and may be an event in which the remaining quantity falls below a given threshold. Furthermore, as the information on the consumable material, information that is a quantity of consumed materials may be used instead of the remaining-quantity information.

The information that is the job name is a file name (an image file name or the like) that is a printing target. An event that triggers transmission of the job name to the server system 7 is an event indicating performance of a new job. It is noted that an event indicating the performance of a new job may be managed, as an event that is the same as an event (a printing starting event) indicating the transitioning from "being on standby" to "printing in progress," in the printer 3 or the like. Furthermore, the job name is not limited to the name of the job that is being performed. It is also possible that the job names extensively include job names (job history information) of jobs of which the number is prescribed, which were performed in the past.

It is noted that the communication interface 531 (the communication interface 331) may reduce the number of transmissions of information to the server system 7, depending on a type of first information. Specifically, the communication interface 531 does not perform the transmission of the information although a new event occurs for a prescribed period of time (for example, for several minutes), after the previous information is transmitted. When this is done, it is possible that a communication load between the information processing apparatus 5 (the printer 3) and the server system 7 is reduced. For example, the communication interface 731 of the server system 7 receives particularly status information or remaining-time information that has a real-time attribute, among pieces of first information, immediately after an event occurs, and imposes an upper limit on the frequency with which the other pieces of information are received.

In contrast to the first information described above, the second information, which results from counting the number of rotations of a roller of the printing unit 35, the number of times that a header reciprocates, the number of times that cleaning is performed, or the like, is useful in terms of long-term maintenance of the printer 3, but there is a weak need for the user to browse through the second information within several minutes after counting-up is performed. Consequently, the communication interface 731 of the server system 7, as indicated by A2 in FIG. 8, receives the second information from the information processing apparatus 5 using HTTP or the like. Then, the reception of the second information using HTTP is performed less frequently (for example, approximately several times per day) than the first information.

3.3 Communication Between the Server System and the Terminal Apparatus

A plurality of paths for communication between the server system 7 and the terminal apparatus 9 are considered. As indicated by B1 in FIG. 8, the communication interface 731 of the server system 7 performs the push notification on the terminal apparatus 9, and the terminal apparatus 9 performs the reception of the push notification by the communication interface 931 and reporting (rumbling) by the reporting unit 934. In other words, the push notification is communication processing that transmits the operation information, which is performed at the initiative of the server system 7 side.

The information, the push notification of which is performed, is information that has a high-real time attribute, among pieces of first information. Specifically, among the pieces of information described above, with the push notification, a change in the status information is transmitted to the terminal apparatus 9. It is noted that the information that is transmitted with the push notification is post-change status information itself. Alternatively, only the information (for example, "occurrence of an error," or the like) indicating that the change in the status information occurs may be transmitted with the push notification, and specific status information may be transmitted through communication that is indicated by B2, which will be described above.

It is noted that, based on the report setting information table in the memory 75, the server system 7 (the processor 71) determines whether or not to perform the push notification on the terminal apparatus 9. A report setting table, for example, is information that results from associating identification information on the terminal apparatus 9, the identification information on the printer 3 that is a target for report, a time span during which reporting is possible, and a day of the week on which reporting is possible with each other. When this is done, it is possible that the server system 7 performs the push notification of suitable information to the user at a suitable timing. For example, in a case where a company to which a certain user belongs has a plurality of printers 3, control is possibly performed in such a manner that the processor 71 (the communication interface 731) limitedly performs the push notification of only information on a printer of which the certain user is in charge or in such a manner that the processor 71 does not perform outside working hours for the certain user.

When compared with the status information, it is difficult for a problem to occur, although an aspect is that the remaining-time information, the information that is the remaining quantity of consumed consumable materials, and the job name, which have low priority, are received in a case where there is a request from the user (from the terminal apparatus 9).

Consequently, as indicated by B2 in FIG. 8, the communication interface 931 of the terminal apparatus 9 transmits a request to the server system 7 (a Web application server), and the server system 7 replies with the operation information as a response to the request. This communication is performed using, for example, HTTP, and is performed at the time of activation of an application software (a so-called smartphone application) in the terminal apparatus 9, or at the time of an update operation by the user. In other words, the communication for the request/response that is indicated by B2 is communication processing that acquires the operation information, which is performed at the initiative of the terminal apparatus 9 side (the user side).

In the communication that is indicated by B2, the terminal apparatus 9 receives the first information described above from the server system 7. When this is done, it is possible that information which is useful for remote monitoring of the printer 3, which uses the terminal apparatus 9, is presented to the user. It is noted that the communication interface 731 of the server system 7 does not need to reply with all pieces of first information described above, and may reply with one or several pieces of the information. For example, in a case where only one or several pieces of information that are display targets are requested at the request of the terminal apparatus 9, the communication interface 731 of the server system 7 replies with only the information that is requested.

Furthermore, in a case where the request from the terminal apparatus 9 is present, in the communication that is indicated by B2, the communication interface 731 of the server system 7 is not prevented from replying with the second information as a response.

4. Example of a Display Screen in the Terminal Apparatus

Next, based on the information that is received from the server system 7, an example of a screen that is displayed on the display 933 of the terminal apparatus 9 will be described. Specifically, a first embodiment in which printing completion time information is displayed, a second embodiment information in which information that is a remaining time to printing is displayed, and a modification example will be all described.

4.1 First Embodiment

The terminal apparatus 9 is not limited to being always connectable to the network NE2 (the Internet). A portable terminal apparatus such as a smartphone is used as the terminal apparatus 9, particularly from the perspective of the convenience of browsing through information, but a situation is considered in which a connection of the portable terminal apparatus to a network is released such as in a tunnel or in a basement.

For example, remaining time to job completion or the like is displayed on the terminal apparatus 9, and thus, the user is made to recognize at which timing returning to operating of the printer 3 has to take place. When disconnection from the network takes place, the terminal apparatus 9 cannot acquire the remaining-time information from the server system 7. As a result, a problem occurs in that a difference between the latest remaining-time information that is acquired by the server system 7 and the remaining-time information that is displayed on the terminal apparatus 9 is increased and so forth, and worse, there is a concern that the user will be prevented from recognizing the operation state.

The terminal apparatus 9 according to the present embodiment is a terminal apparatus that is communicatively connected to the server system 7 that collects the operation information on at least one printer 3, through the network NE2, and includes the communication interface 931 that receives the printing time information, which indicates time to printing completion by the printer 3 or printing completion time, through the network NE2, the display 933, and the processor 91 that performs processing which displays information that is based on the printing time information, on the display 933. Then, the processor 91 causes a mode for displaying the printing time information on the display 933 to change between a first state where the reception of the printing time information from the server system 7 through the network NE2 succeeds and a second state that is at least one of a state where the reception fails and a state where the reception is in progress.

Figure 10:
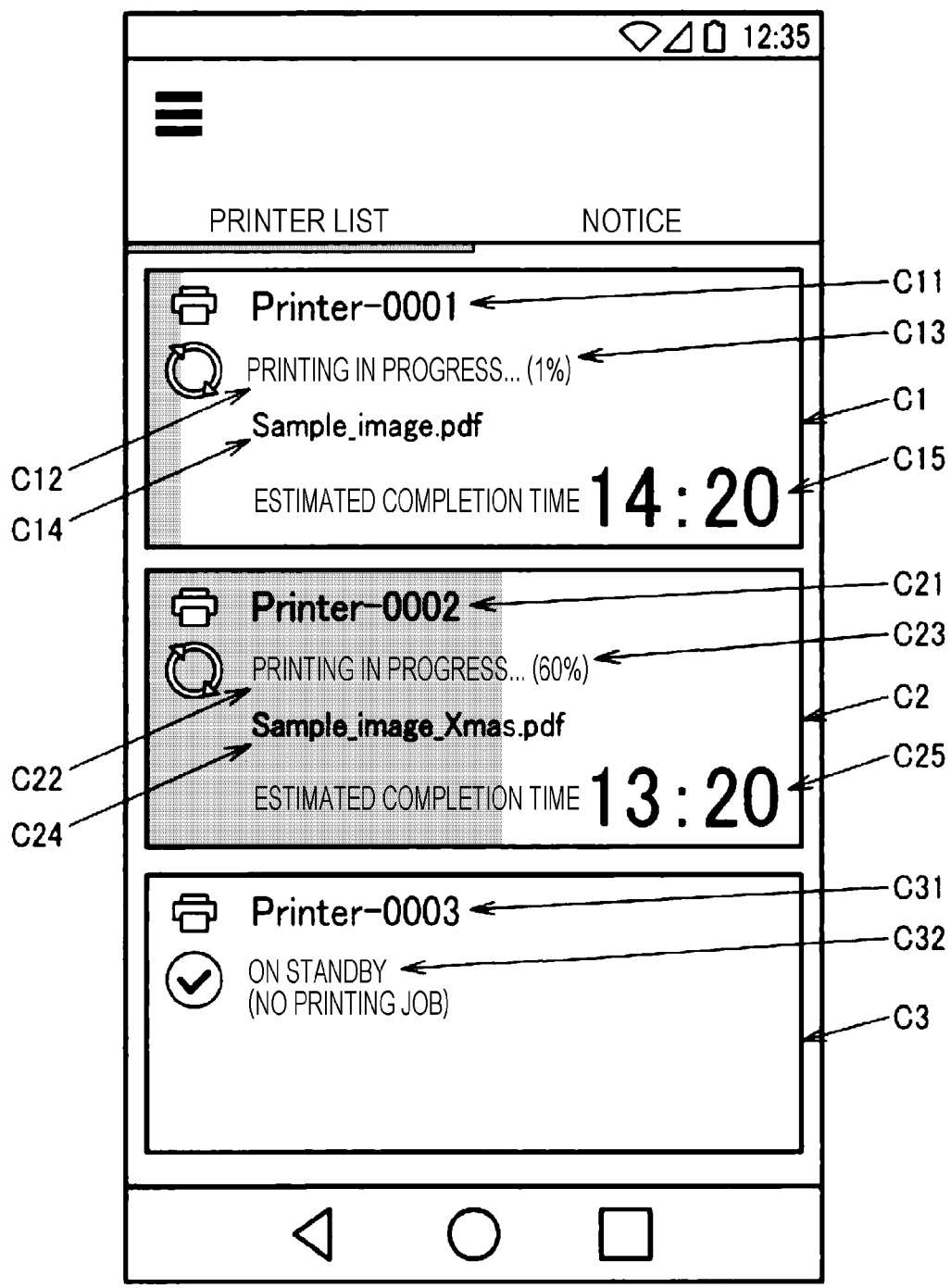
FIG. 10 is an example of a display screen in a first state.

FIG. 10 is an example of a display screen that is displayed on the display 933 of the terminal apparatus 9 in the first state. The communication interface 931 of the terminal apparatus 9 receives pieces of printing time information on a plurality of printers 3, through a network, and the processor 91 performs processing that displays the display screen, within one screen of which the pieces of printing time information on the plurality of printers 3 are arranged, on the display 933. More specifically, the processor 91 of the terminal apparatus 9 performs processing that causes the display screen, within one screen of which pieces of printing completion time information on a plurality of printers 3 are arranged, to be displayed on the display 933. The printing completion time information is time information for predicting when the printing operation by the printer 3 will be completed. It is noted that, in the present embodiment, a plurality of printers 3 are not necessarily display targets and that information on one printer 3 may be displayed on the display 933.

In the example in FIG. 10, pieces of information on three printers 3 are displayed on the display 933. For example, along with "Printer-0001" (C11) that is a name of the printer 3, status information (C12) as the operation information, information (C13) on progress in performing a job, a job name (C14), and printing completion time information (C15) are displayed on an area that is indicated by C1. Specifically, a printer that has a name which is "Printer-0001" has a status that is "printing in progress," and performs a job that has a job name which is "Sample_image.pdf." At this point, the job name is a name of a file that is a printing target. Then, when the completion of the job is assumed to be 100%, progress is 1%, and the printing completion time is "14:20."

Furthermore, on an area that is indicated by C2, of the display 933, it is shown that a printer that has a name which is "Printer-0002" has a current status that is "printing in progress" and performs a job that has a job name (a printing target file name) which is "Sample_image_Xmas.pdf," that the progress in performing the job is "60%," and that the printing completion time is "13:20."

On an area that is indicated by C3, of the display 933, it is shown that a printer that has a name which is "Printer-0003" has a current status which is "being on standby" (an idle state). Because Printer-0003 is in the idle state, the job name, the information on the progress, and the printing completion time information are not displayed.

By using the display screen in FIG. 10, it is possible that operation states of a plurality of printers 3 are presented to the user in a more perspicuous manner. Particularly, because the printing completion time information is displayed, in a case where a plurality of printers 3 are display targets, the printing completion time is also easy to know. For example, on the display screen in FIG. 10, because the earliest printing completion time is easy to know, it is possible that the user is caused to determine that by that time, he/she has to return to a place where the printer 3 is installed and prepare for assignment of a next job.

Figure 11:
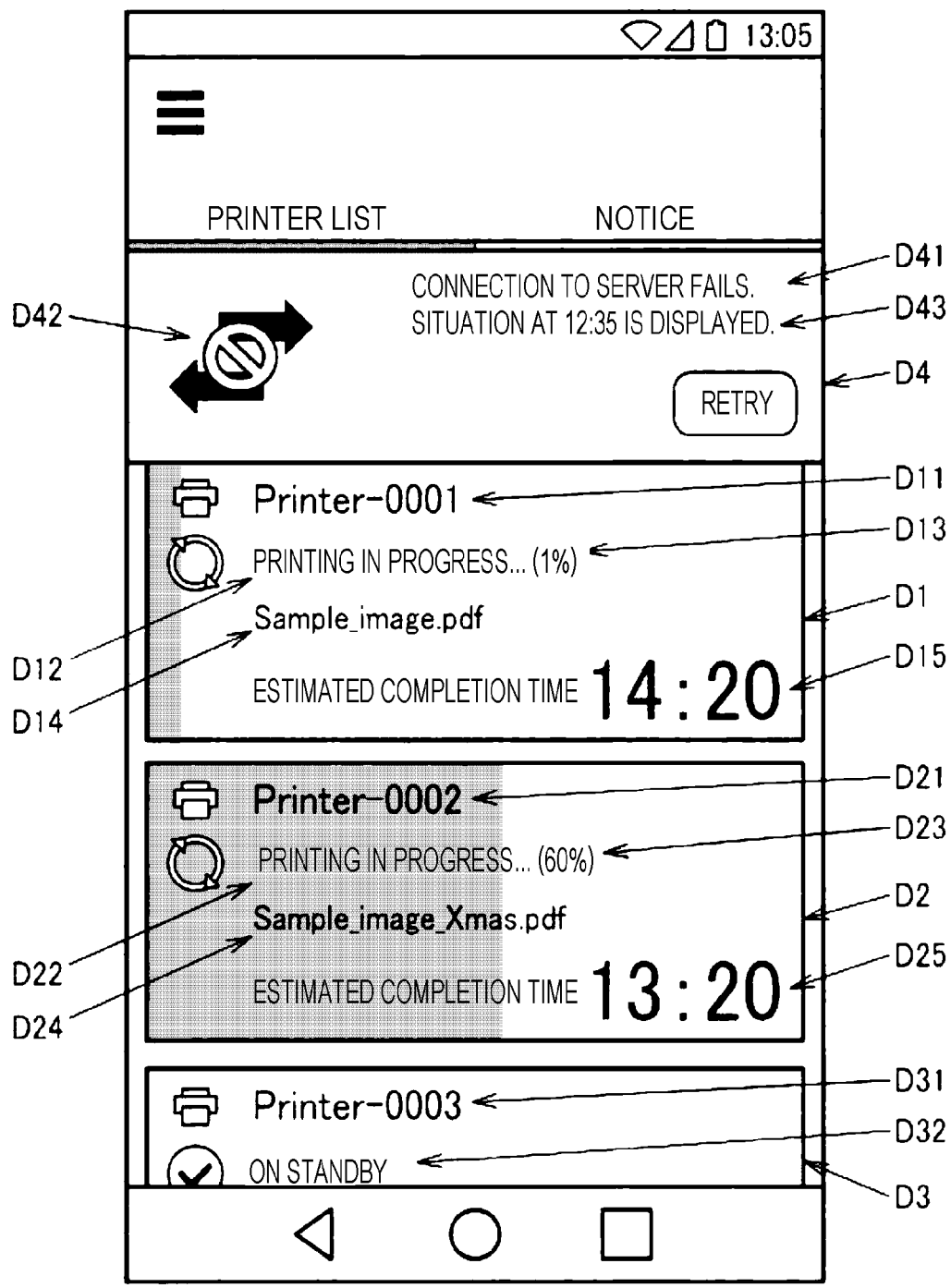
FIG. 11 is an example of a display screen in a second state.

FIG. 11 is an example of the display screen that is displayed on the display 933 of the terminal apparatus 9 in the second state (at the time of the failure of the reception in a narrow sense). The following examples are considered as a situation that is illustrated in FIG. 11.

First, an application software is activated on the terminal apparatus 9 at 12:35. At the timing, the reception of the printing time information from the server system 7 succeeds, and thus a screen in FIG. 10 is displayed. After the screen FIG. 10 is browsed through, the application software is temporarily ended by the user, and the application software is activated again at 13:05. However, because at the timing, the user is in a tunnel and in a basement, the reception of the printing time information from the server system 7 through the network NE2 fails.

In the situation in question, it is assumed that the server system 7 acquires printing time information as of 13:05 or at a timing sufficiently close to 13:05, but the printing time information cannot be acquired in the terminal apparatus 9. In this case, the processor 91 of the terminal apparatus 9 performs processing that displays information, such as "A connection to the serve fails," on the display 933. However, in this display, it is difficult for the user to know the operation state of the printer 3.

Consequently, in the second state, the processor 91 of the terminal apparatus 9 performs processing that displays information that is based on the printing time information of which the reception succeeds in the first state that is earlier than the second state, on the display 933. More specifically, in the second state, the processor 91 performs processing that displays the printing completion time information that is based on the printing time information of which the reception succeeds in the first state that is earlier than the second state, on the display 933.

At this point, the printing time information of which the reception succeeds in the first state that is earlier than the second state refers to information that is temporally newest (that is received last), of the pieces of printing time information of which the reception succeeds specifically in the first state. In the case of the situation setting described above, the printing time information of which the reception succeeds in the first state that is earlier than the second state refers to printing time information of which the reception is received at the time 12:35.

In the case of an example in FIG. 11, the processor 91 performs control that displays information (D1) relating to "Printer-0001" at the time 12:35, information (D2) relating to "Printer-0002" at the time 12:35, and information (D3) relating to "Printer-0003" at the time 12:35, on the display 933. The pieces of information that are indicated by D1 to D3 correspond to the pieces of information, respectively, that are indicated by C1 to C3 in FIG. 10.

It is considered that during a time period from 12:35 to 13:05, if printing is delayed due to flushing, cleaning, or the like in the printer 3, or if printing is performed fast due to many white areas (areas to which a printer head does not need to be moved) or the like, the printing completion time is the same as at the time 12:35 and also at the time 13:05. More precisely, it can be said that the printing completion time information at the time 12:35 is not limited to being consistent with the printing completion time (which is collected by the server system 7) that is stored by the printer 3 at the time 13:05, and is useful information as a standard for the printing completion time. The terminal apparatus 9 displays the printing completion time information that is based on the printing time information of which the reception succeeded in the past. Thus, also in the second state, the terminal apparatus 9 possibly presents the operation information on the printer 3 to the user.

However, if the fact, as described above, is that printing is delayed or is performed fast during the time period from 12:35 to 13:05, there occurs a difference between the printing completion time information that is received by the terminal apparatus 9 at the time 12:35 and the printing completion time that is stored by the printer 3 (and the server system 7) at the time 13:05. More precisely, it is preferable that the fact that the printing completion time information that is displayed in the second state has less reliability than when the printing completion time information is displayed in the first state is made clear to the user.

Consequently, the processor 91 according to the present embodiment not only displays past printing completion time information in the second state, but also performs display processing of incidental information. For example, in the second state, the processor 91 performs processing that displays warning information indicating an abnormality in the connection to the server system 7 on the display 933.

In an example in FIG. 11, the processor 91 performs processing that displays pieces of warning information that are indicated by at least D41 and D42 in an area that is indicated by D4. As the pieces of warning information, various types of information are possibly used. As indicated by D41, the warning information may be text information such as "A connection to the server fails, and may be image information (an icon) as indicated by D42. An example that is indicated by D42 represents an image that results from superimposing a figure that is made up of a circle and an oblique line which are widely used as a prohibition mark, on arrows in the right direction and the leftward direction. By displaying the figure that is indicated by D42, it is possible that the user is made to understand a failure in bidirectional communication between the server system 7 and the terminal apparatus 9. Furthermore, the processor 91 may differentiate a background color of an area that is indicated by D4 from background colors of areas that are indicated by D1 to D3. The display processing of the warning information according to the present embodiment may include display processing that differentiates background colors.

Furthermore, in the second state, the processor 91 performs processing that displays the time information indicating the latest timing at which the reception of the printing time information from the server system 7 through the network NE2 succeeds, on the display 933. The time information indicating the latest timing at which the reception of the printing time information succeeds is specifically information indicating the time at which the printing time information that is used for the displaying (D1 to D3 in FIG. 11) on the display 933 is received, and, in the case of the situation setting described above, which is an example, is information indicating 12:35.

The processor 91 in FIG. 11 displays text information such as "The situation at 12:35 is displayed" as indicated by D43 in an area that is indicated by D4, and thus makes clear what time the information that is displayed relates to.

As described, to what degree of difference there is between the past printing completion time information that is used for displaying and the correct printing completion time Information that is stored by the printer 3 differs depending on the operation state of the printer 3. However, it is considered that the greater a difference between a current time and the latest timing at which the reception succeeds, the higher the probability of the difference being increased. Consequently, as illustrated in FIG. 11, the latest timing (time) at which the reception succeeds is also expressed, and thus, it is possible that the user is made to estimate the reliability of the printing completion time that is displayed.

It is noted that the description is provided above on the assumption of the case of the transition from the first state to the second state. However, it is also considered that, after the second state is reached, the communication is resumed (transitioning to the first state takes place). For example, a case is considered where, among first to N-th (N is an integer that is equal to greater than 2) timings, the reception of the printing time information succeeds at the first timing, the reception of the printing time information fails in the second to (N−1)-th timings, and the reception of the printing time information succeeds at the N-th timing.

In this case, during a time period that corresponds to the second to (N−1)-th timings, the processor 91 performs processing that displays information which is based on the printing time information that is received at the first timing, and the warning information indicating the abnormality in the connection to the server system 7, on the display 933. That is, in a case where the second state is reached and where returning to the first state cannot take place, the displaying that uses the latest printing time information (the printing time information at the first timing) of which the reception succeeds is continued.

Then, at the N-th timing, the processor 91 performs processing that displays information that is based on the printing time information that is received at the N-th timing, on the display 933, and performs processing that sets the warning information not to be displayed. That is, in a case where the returning to the first state takes place, because the communication interface 931 succeeds in receiving the printing time information that has high reliability, the processor 91 uses the latest information that is received by the communication interface 931, for displaying. By doing this, it is possible that the processor 91 sets optimal printing time Information suitable at each timing to be a display target.

4.2 Second Embodiment

Figure 12:
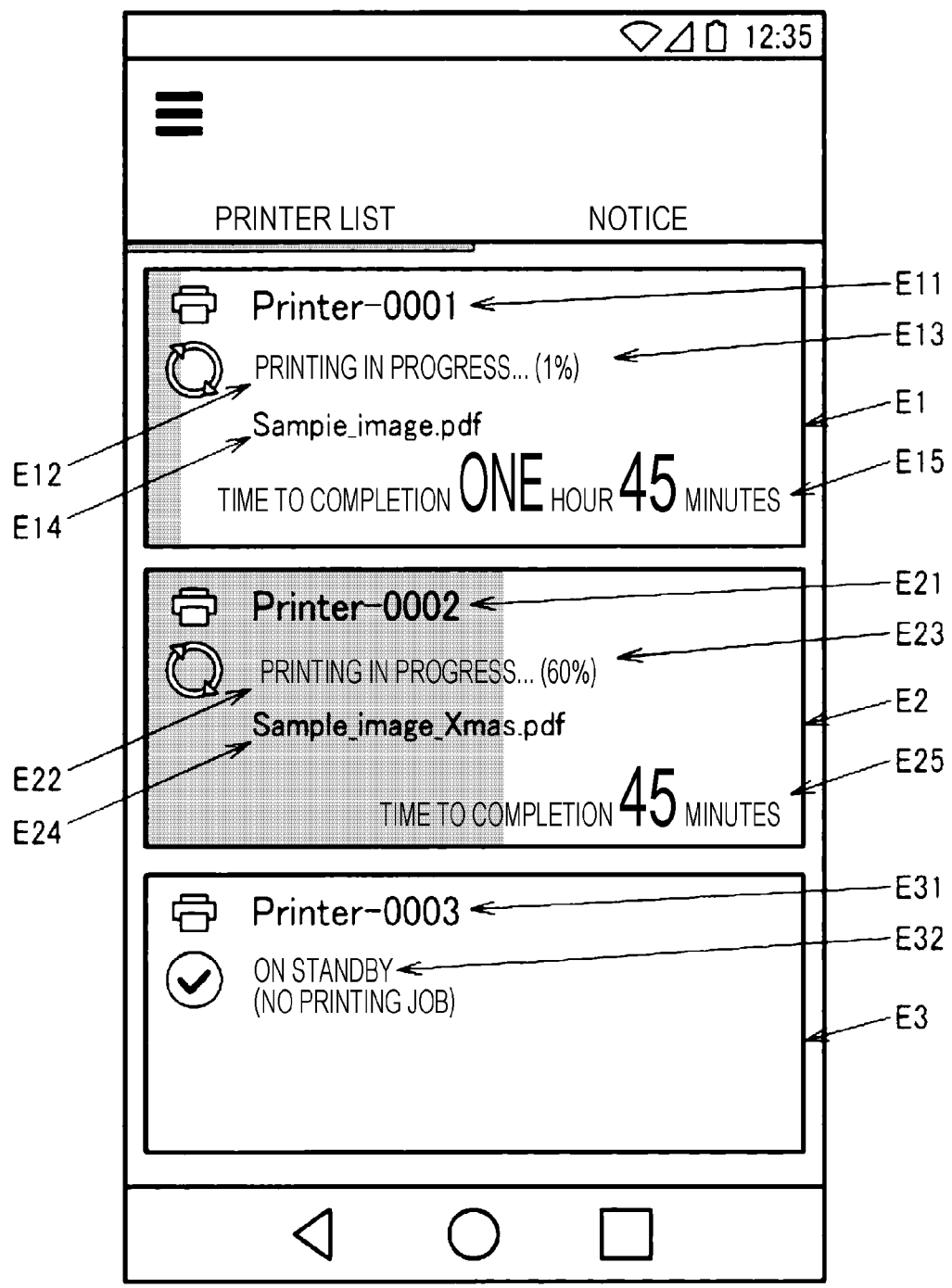
FIG. 12 is an example of the display screen in the first state.

FIG. 12 is an example of the display screen that is displayed on the display 933 of the terminal apparatus 9 in the first state. The communication interface 931 of the terminal apparatus 9 receives pieces of printing time information on a plurality of printers 3, through the network NE2, and the processor 91 performs processing that displays the display screen, within one screen of which pieces of information that are remaining times to completion of printing by the plurality of printers 3 are arranged, on the display 933.

In the example in FIG. 12, in the same manner as in FIG. 10, pieces of information on three printers are displayed on the display 933 displays. The printing completion time information (C15) on "Printer-0001" is displayed on C1 in FIG. 10, but information that is "one hour 45 minutes" which is information that is the remaining time to the printing completion is displayed in the example in FIG. 12 (E15). E11 to E14 of E1 are the same as C11 to C14 in FIG. 10, respectively. Furthermore, this is also true for "Printer-0002," and instead of the printing completion time information, information that is "45 minutes" which is the remaining-time information is displayed (E25).

Figure 13:
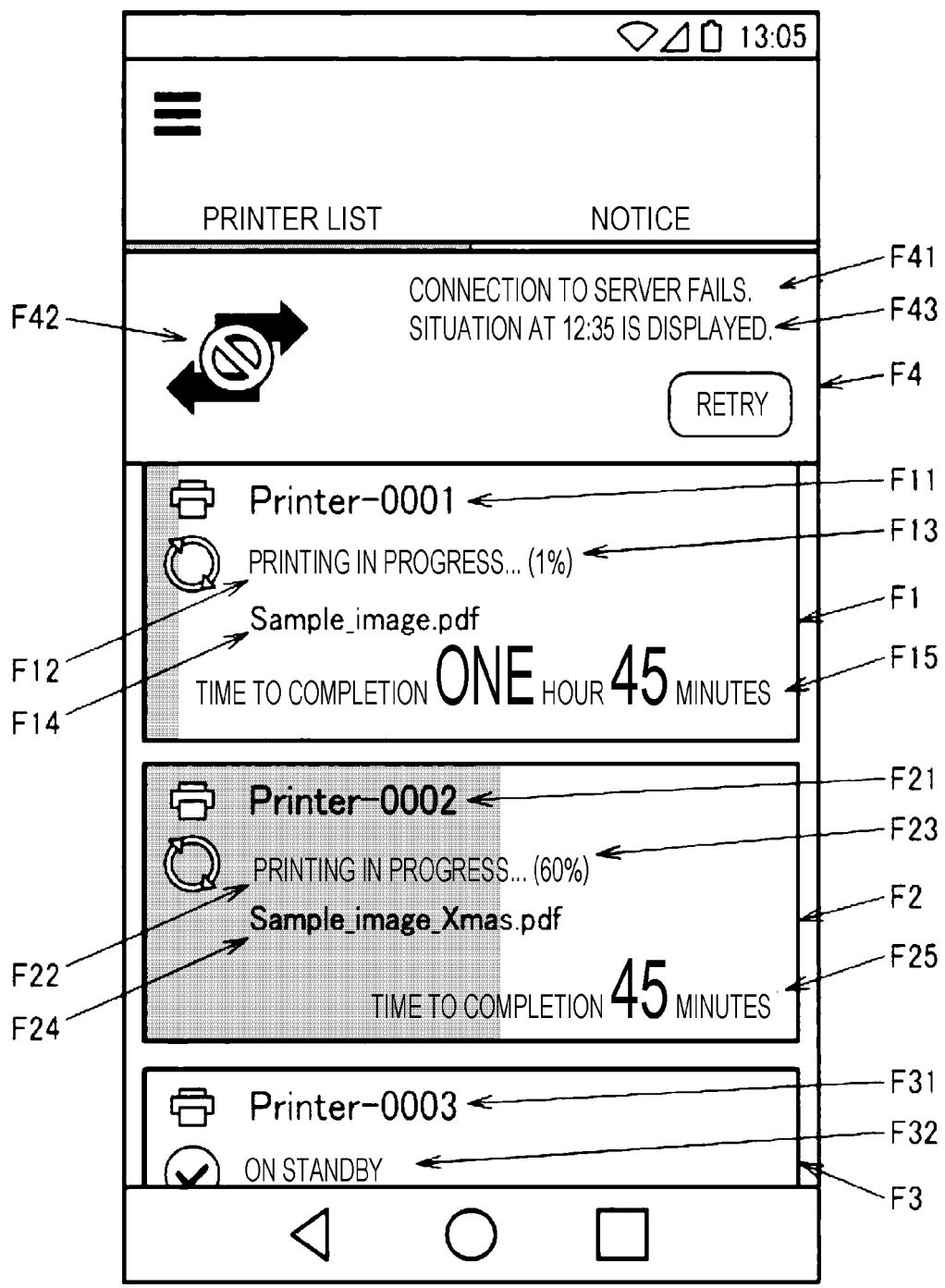
FIG. 13 is an example of the display screen in the second state.

FIG. 13 is an example of the display screen that is displayed on the display 933 of the terminal apparatus 9 in the second state (at the time of the failure of the reception in a narrow sense). The following examples as in the first embodiment are considered as a situation that is illustrated in FIG. 13.

In the second state, the processor 91 of the terminal apparatus 9 performs processing that displays information which is the remaining time to the printing completion, which is based on the printing time information of which the reception succeeds in the first state that is earlier than the second state, on the display 933. In the example that is illustrated in FIG. 13, in the same manner as in the first embodiment, the processor 91 displays information that is temporally newest (that is received last), of the pieces of printing time information of which the reception succeeds, and, in the situation setting described above, displays the remaining-time information at the time 12:35. That is, in F1 to F3 in FIG. 13, the processor 91 performs processing that performs displaying in the same manner as in E1 to E3 in FIG. 12, and, along with this, performs the display processing of the warning information (F4) in the same manner as in D4 in FIG. 11.

However, it is considered that, as long as no operation such as flushing occurs on the printer 3 side, the remaining time that is the information decreases with the passage of time. For this reason, in a case where, at the time 12:35, as illustrated in FIG. 13, the remaining-time information that is "one hour 45 minutes" is displayed and does not change even with the passage of time, there is a concern that the user who performs browsing will feel uncomfortable.

Furthermore, in a case where the display in FIG. 13 is performed, there is a need for the user to predict, from information that is "one hour 45 minutes" which is a remaining time at the time 12:35, that the printing will be completed at around the time 14:20, or to predict, from a time difference of 30 minutes between 12:35 and a current time (13:05), that a current remaining time will be one hour 15 minutes. More precisely, in a case where the remaining-time information is displayed, the maintenance of the past display as illustrated in FIG. 13 requires the user to perform any arithmetic operation.

Consequently, in the second state, the processor 91 of the terminal apparatus 9 performs counting-down processing of the remaining time that is the information, based on clocking information from a timer, and performs processing that displays the remaining-time information that goes through the counting-down processing, on the display 933. For example, the terminal apparatus 9 includes the timer such as a real time clock, and the processor 91 performs the counting-down processing based on the clocking information (the time information) from the real time clock. It is noted that the clocking information here is not limited to information indicating an absolute time, and may be other information (for example, a time stamp) or the like that possibly results from measuring the time. Alternatively, the processor 91 may acquire the clocking information from the network NE2 (the Internet in a narrow sense) through the communication interface 931, and may perform the counting-down processing based on the clocking information. That is, the timer here may be included in the terminal apparatus 9 and may be included in external equipment.

Figure 14:
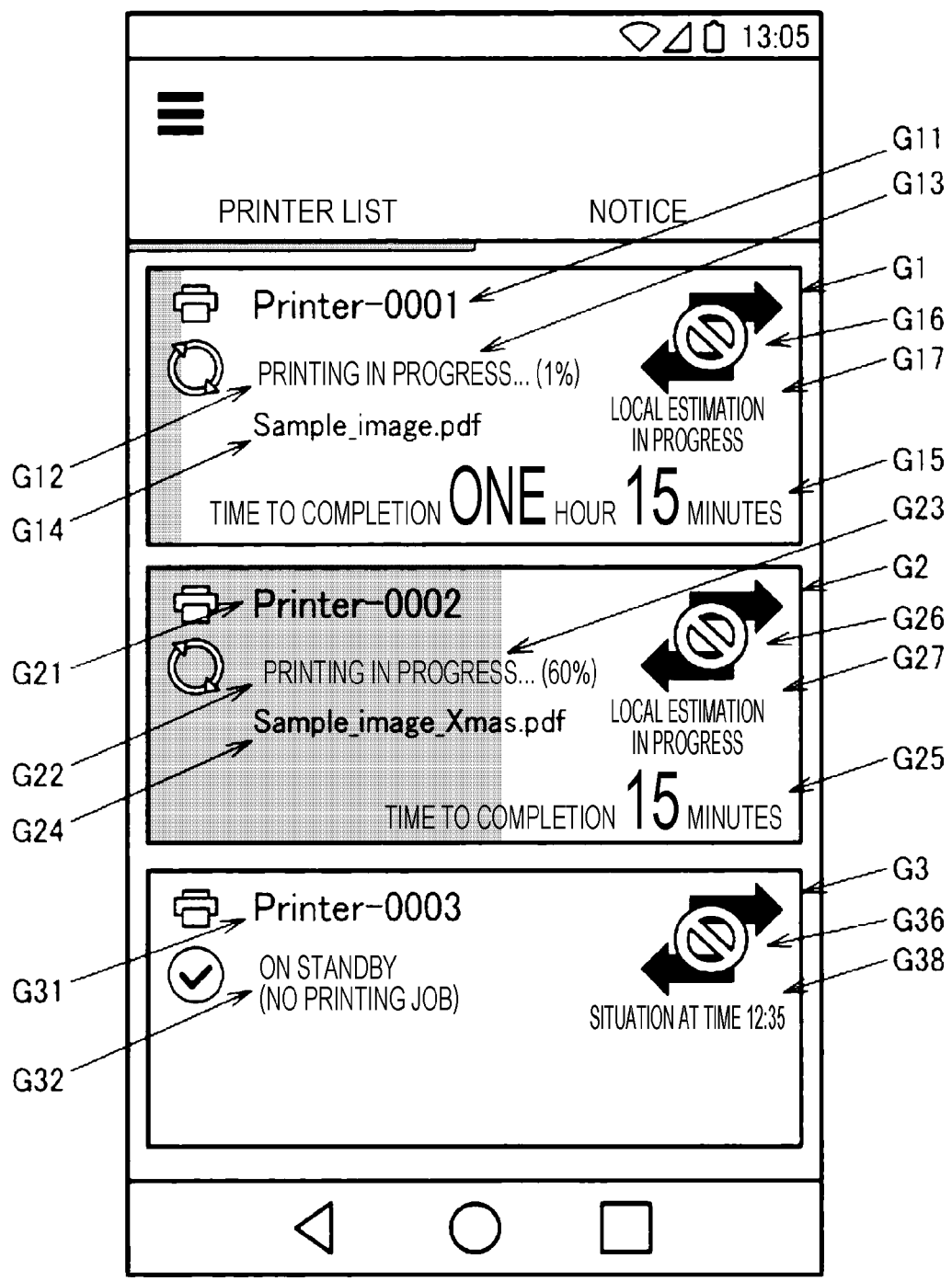
FIG. 14 is an example of the display screen in the second state.

FIG. 14 is another example of the display screen that is displayed on the display 933 of the terminal apparatus 9 in the second state (at the time of the failure of the reception in a narrow sense). In "Printer-0001" in FIG. 14, which is an example, the processor 91 performs the counting-down processing based on the clocking information from then timer, and updates "one hour 45 minutes that is the remaining-time information at the time 12:35, and updates the remaining-time information. Specifically, by the counting-down processing, the processor 91 estimates that the remaining-time information at a current time will be "one hour 15 minutes," and displays a result of the estimation (G15). This is also true for "Printer-0002," and, the processor 91 performs the counting-down processing based on "45 minutes" that is the remaining-time information at the time 12:35, and the clocking information from the timer, and displays "15 minutes" that is a result of the counting-down processing (G25).

When this is done, because the remaining-time information can be presented to the user with a current time as a reference, it is possible that an easy-to-understand interface is realized. It is noted that, in a case where the user continues to display a screen without ending application software, the processor 91 may perform display processing that updates the remaining-time information at a prescribed interval (for example, every one minute). When this is done, even in a case where the screen continues to be displayed, because the remaining-time information changes with the passage of time, the displaying that causes the user to feel less uncomfortable is possible.

It is noted that the processor 91 performs processing that maintains displaying of names (G11, G21, and G31) of printers 3, pieces of status information (G12, G22, and G32), pieces of information (G13 and G23) on progress in performing a job, and job names (G14 and G24), in the first state (FIG. 12). However, because there is a one-to-one relationship between the remaining-time information and the information on the progress (a percentage of unfinished portions of the job) in performing in the job, it is possible that the processor 91 performs an arithmetic operation of the information on the progress at a current time from the remaining-time information that is estimated by the counting-down processing. Consequently, the processor 91 may perform display processing that caused not only the remaining-time information, but also the information on the progress in performing the job, to change with the passage of time.

Furthermore, in the second state, the processor 91 performs processing that displays the warning information which indicating the abnormality in the connection to the server system 7, and processing that displays information which indicates that the remaining-time information which is displayed is estimated.

In the case of the example in FIG. 14, the processor 91, as indicated by G16, G26, and G36, displays the same image (icon) as indicated by D42 in FIG. 11, and thus warns the user of the abnormality in the connection. Furthermore, the processor 91, as indicated by G17 and G27, displays text information that is "local estimation in progress, and thus provides a warning that reliability of the remaining-time information which is indicated by G15 and G25 is not sufficiently high. Furthermore, the processor 91, as indicated by G38, displays text information that is "situation at the time 12:35," and makes clear what time information which is the status information that is "on standby" relates to. As text that is indicated by G38, the same text as indicated by D43 in FIG. 11 may be used.

However, a specific detail of warning display is not limited to FIG. 14, and various modifications to the warring display are possible. For example, the processor 91 may perform processing that displays a time at which the reception of the printing time information succeeds last, that is, a time (the time 12:35 in the case of the example described above) that is a starting point in time for the local counting-down processing in the terminal apparatus 9, on one portion of an area that is indicated by G1 or G2.

It is noted that, as described in the first embodiment and the second embodiment, the printing time information may be the printing completion time information, and may be the information that is the remaining time to the printing completion. Then, a type of printing time information that is collected in the server system 7 and a type of the printing time information that is displayed on the terminal apparatus 9 are possibly realized by various combinations.

For example, the communication interface 931 may receive the printing completion time information, as the printing time information, from the server system 7. In this case, the processor 91 of the terminal apparatus 9 performs the processing (the first embodiment) that displays the received printing completion time information on the display 933, or the processing (the second embodiment) displays the information that is the remaining time to the printing completion, which is obtained based on the received printing completion time information, on the display 933.

Alternatively, the communication interface 931 may receive the remaining-time information, as the printing time information, from the server system 7. In this case, the processor 91 of the terminal apparatus 9 performs the processing (the second embodiment) that displays the received remaining-time information on the display 933, or the processing (the first embodiment) that displays the printing completion time information which is obtained based on the received remaining-time information, on the display 933.

4.3 Modification Examples

Several modification examples will be described below.

As described above with reference to FIG. 10 or 12, the processor 91 displays pieces of printing time information on a plurality of printers 3 side by side on a first screen. It is possible that pieces of information on a plurality of printers 3 are displayed on this display screen in a more perspicuous manner, but an amount of information for one printer 3 is limited. For example, in FIG. 10 and other figures, among pieces of first information, information on the remaining amount of ink or history information on the job name are not the display targets. Consequently, when any printer is selected from among a plurality of printers 3, pieces of printing time information on which are displayed, the processor 91 performs processing that enlarges a display area for the printer on which a selection operation is performed and displays detail information.

Figure 15:
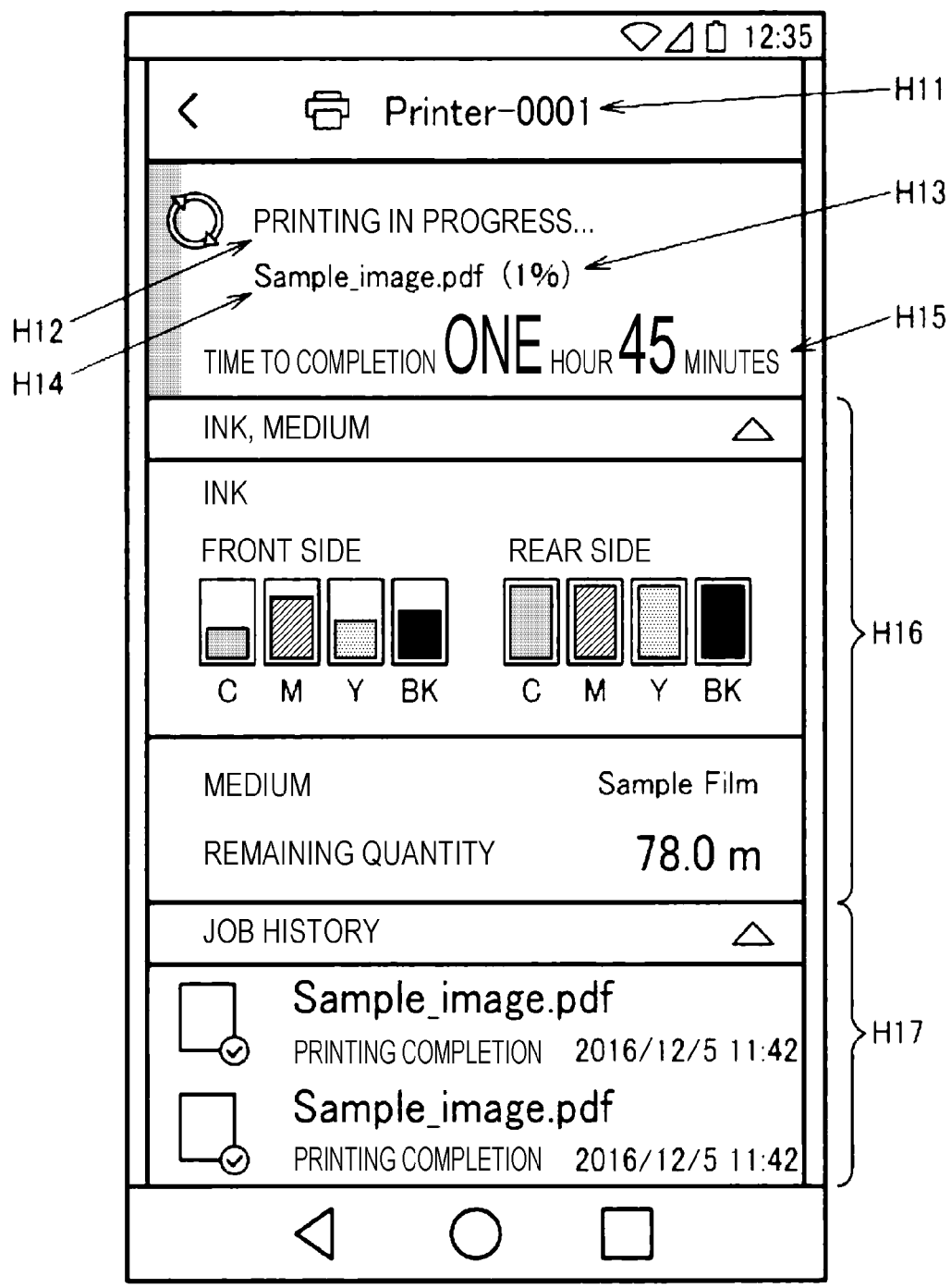
FIG. 15 is an example of a display screen for detail information.

FIG. 15 is an example of the display screen on which the detail information is displayed. FIG. 15 corresponds to the display screen in a case where, for example, in a state where the display in FIG. 12 is performed, the user performs an operation of selecting "Printer-0001." In addition to displays (H11 to H15) of pieces of information that correspond to E11 to E15, respectively, in FIG. 12, the processor 91 displays pieces of information (H16) that are a remaining amount of ink and a remaining quantity of media (paper sheets or pieces of cloth) and job history information (H17).

When this is done, by suitably switching between the more perspicuous display (FIG. 12) and the detail display (FIG. 15), it is possible that suitable information is presented to the user. It is noted that the information which is displayed as the detail information is not limited to FIG. 15 and that various modifications are possible. Furthermore, the example in which the detail information is displayed on a screen that is different from that in FIG. 12 ("Printer-0002," or "Printer-0003" is not illustrated) is illustrated in FIG. 15, but different modifications are also possible. For example, it is also possible that, as illustrated in FIG. 12, the detail information is additionally displayed on a screen on which pieces of information on a plurality of printers 3 are displayed side by side. Specifically, in a case where "Printer-0001" is selected, display that is equivalent to H16 or H17 may be inserted between E1 and E2 in FIG. 12. In this case, although the detail information is being displayed, by performing a scrolling operation, it is possible that other pieces of information such as "Printer-0002" are browsed through.

Furthermore, in a case where, as in the first embodiment, an estimated completion time is used for processing, depending on the situation, a current time can also be later than the estimated completion time. In a case where the abnormality in the connection does not occur, if printing is completed, an event that is a status change, occurs. Because of this, with the push notification, a message indicating the occurrence of the event is received in and is reported to the terminal apparatus 9. However, at the time of the abnormality in the connection, there is a high probability that the reception of the push notification will also fail, and there is a concern that the user will overlook the fact that the job is ended (the printer 3 will be left in a non-operation state). Furthermore, also in the second embodiment, in some cases, depending on the situation, the remaining time can be 0 or less as a result of the counting-down processing. Also in this case, because the push notification is transmitted from the server system 7, there is a concern that there will occur a situation where the reception in and the notification to the terminal apparatus 9 cannot be performed due to the abnormality in the connection.

Consequently, in a case where a current time is later than the estimated completion time, or in a case where the remaining time is 0 or less as a result of the counting-down processing, the processor 91 may make a report to the effect that the printing completion is estimated. For example, the processor 91 may display a message indicating that the printing completion is estimated, on the display 933 and may instruct the reporting unit 934 to make a report to that effect. Alternatively, the processor 91 may instruct the communication interface 931 to make an attempt to perform communication with the server system 7.

Furthermore, as described above, as the second state, a state where the reception of the printing time information fails is used. However, the second state may include the state where the reception is in progress.

Figure 16:
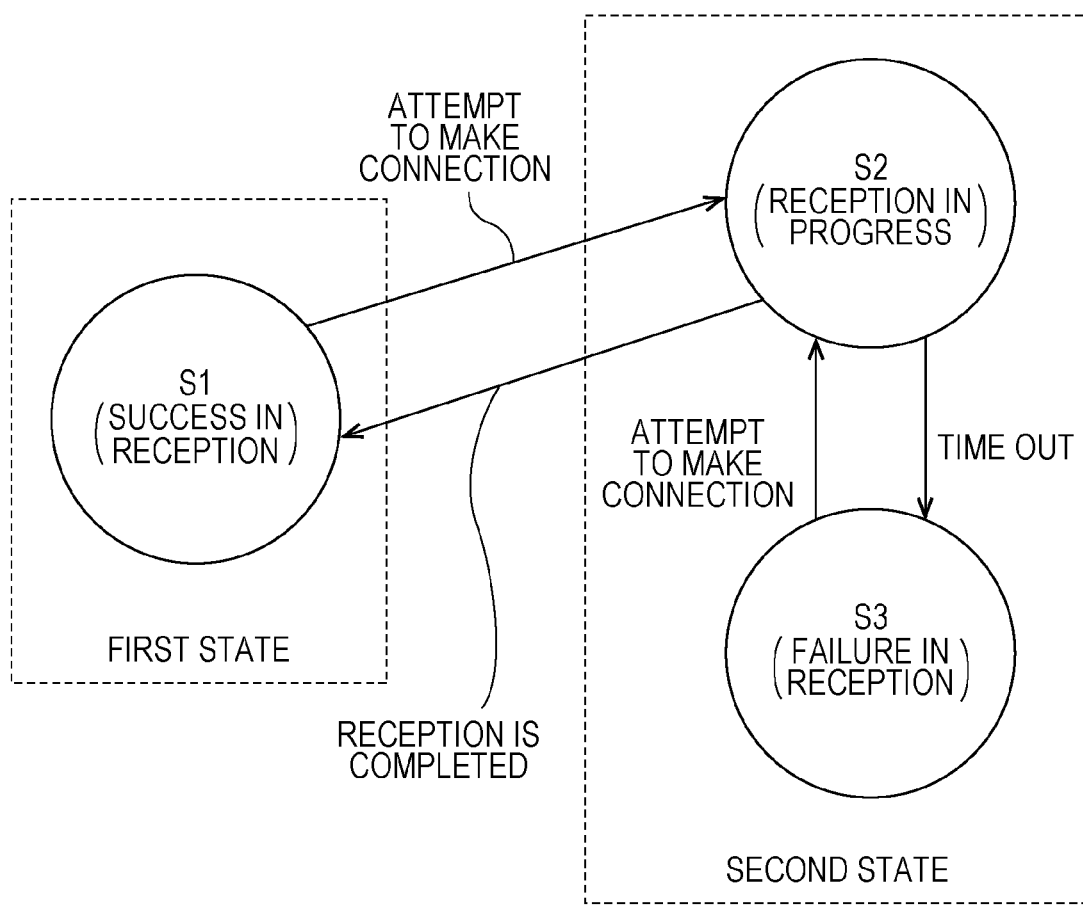
FIG. 16 is an inter-state diagram for describing the first state and the second state.

FIG. 16 is a diagram illustrating that the terminal apparatus 9 according to the present embodiment transitions between states. A state of the terminal apparatus 9 is determined according to a state of communication between the communication interface 931 and the server system 7. S1, S2, and S3 correspond to states where the reception succeeds, is in progress, and fails, respectively.

As illustrated in FIG. 16, where an attempt is made by the communication interface 931 to make a connection, proceeding to the state S2 takes place. An original state, the transitioning to the State S2 from which takes place, may be S1, may be S3, and may be a state (for example, an initial state) that is not illustrated. In the state S2, transmission of a request to the server system 7, or reception of a response to the request from the server system 7 is performed.

In the state S2, in a case where the reception of the printing time information is completed within a prescribed time, proceeding to the state S1 takes place. It is assumed that, if there is no abnormality in the connection, transitioning from the state S2 to the state S1 takes place in order to complete the reception of the printing time information before time out occurs.

On the other hand, after the attempt is made to make the connection, in a case where the reception of the printing time information is not completed within a prescribed time, the processor 91 determines that the time out occurs, and causes the transitioning from the state S2 to the state S3 to take place. In a case where pieces of printing time information cannot be all received, or in a case where a reception speed is extremely low, that is, in the case of the abnormality in the connection, the time out occurs.

The second state described above may include both of S2 and S3. In this case, in a case where the attempt is made to make the connection is made (the state S2), regardless of whether, as a result of the attempt to do so, the reception succeeds (the state S1) or fails (the state S3), the display processing is temporarily performed in a display mode, which is different from the first state (the state S1), in the processor 91, considering that the second state is entered. For example, in the state S2, in addition to the display in the state S1 (in FIG. 10 or 12), the processor 91 displays information indicating that update is in progress. The information indicating that the update is in progress may be text information or may be image information (for example, an icon, an arrow mark in the shape a circle, or the like). Furthermore, the image information is not limited to a still image, and may be a moving image.

If the connection is normally made, because the time for which the state S2 is maintained is extremely short, the processor 91 ends the displaying of the information indicating that the update is in progress, within a short time, and performs processing that causes switching to the display in FIG. 10 and other figures. Furthermore, if there is an abnormality in the connection, the processor 91 continues to display the information indicating that the update is in progress, until it is determined that the time out occurs, and, at a timing at which it is determined that the time out occurs, performs processing that causes switching to the display in FIG. 11 or 13, FIG. 14, and the like.

Furthermore, the example is described above in which the operation information on the printer 3 is collected, but a target, the operation information on which is collected, is not limited to the printer 3. That is, the technique according to the present embodiment can apply to a terminal apparatus 9 that is communicatively connected to a server system 7 that collects operation information on at least one piece of equipment, operation information on which is a target for collection, through a network NE2, the terminal apparatus 9 including a communication interface 931 that receives, through a network, job completion time information that indicates time to completion of a job that is performed in the equipment, the operation information on which is the target for collection, or indicates a job completion time; a display 933; and a processor 91 that performs processing which displays information that is based on the job completion time information, on the display 933. The processor 91 of the terminal apparatus 9 causes a mode for displaying the job completion time information to change between a first state where reception of the job completion time information from the server system 7 through the network NE2 succeeds and a second state that is at least one of a state where the reception fails and a state where the reception is in progress.

Furthermore, as illustrated in FIG. 1, the technique according to the present embodiment can apply to an operation information collection system 1 that includes a terminal apparatus 9 and a server system 7, which are described above.

Furthermore, one or several of or most of the processing operations by the terminal apparatus 9 or the like according to the present embodiment may be realized by a program. In this case, a processor such as a CPU executes the program, and thus, the terminal apparatus 9 or the like according to the present embodiment is realized. Specifically, the program that is stored on a non-transitory information storage medium is read and the processor such as the CPU executes the program that is read. The information storage medium (computer-readable medium) here is one on which a program, data, or the like are stored, and a function thereof can be realized by an optical disk (a DVD, a CD, or the like), a hard disk driver (HDD), a memory (a card-type memory, a ROM, or the like), or the like. Then, the processor such as the CPU performs various processing operations according to the present embodiment based on the program (the data) that is stored in the information storage medium. That is, a program (a program that causes a computer to perform processing by each unit) for causing a computer (an apparatus that includes an operation unit, a processor, a memory, and an output unit) to function as each unit according to the present embodiment is stored in the information storage medium.

Furthermore, the terminal apparatus 9 or the like according to the present embodiment may include a processor and a memory. The processor here, for example, may realize a function of each unit in individual hardware, or may realize the function of each unit in integrated hardware. For example, the processor can include a piece of hardware, and the piece of hardware can include at least one of a circuit that processes a digital signal and a circuit that processes an analog signal. For example, the processor can be configured with one or more circuit devices (for example, an IC or the like) that is mounted on a circuit substrate, or with one or more circuit elements (for example, a resistor, a capacitor, or the like). The processor, for example, may be a CPU. However, the processor is not limited to the CPU, and it is possible that various processors such as a graphics processing unit (GPU) or a digital signal processor (DSP) are used. Furthermore, the processor may be a hardware circuit that is an ASIC. Furthermore, the processor may include an amplification circuit, a filter circuit, or the like that processes an analog signal. The memory may be a semiconductor memory such as a SRAM or a DRAM, may be a resistor, may be a magnetic storage device such as a hard disk device, and may be an optical storage device such as an optical disk. For example, a computer-readable instruction is stored in the memory, and execution of the instruction by the processor realizes a function of each unit (the communication interface or a processor) of the terminal apparatus 9. The instruction here may be a command in an instruction set that makes up the program, and may be an instruction that instructs a hardware circuit of the processor to perform an operation.

Furthermore, the technique according to the present embodiment can apply to a method of operating a terminal apparatus 9, the method including performing processing that receives printing time information which indicates a time to completion of printing by the printer 3 or a printing completion time, through a network; performing processing that displays information which is based on the printing time information, on a display 933; and causing a mode for displaying the printing time information on the display 933 to change between a first state where the reception of the printing time information from a server system 7 through the network succeeds and a second state that is at least one of a state where the reception fails and a state where the reception is in progress.

The embodiments and the modification examples thereof to which the invention is applied are described above, but the invention is not limited to the embodiments and the modification examples thereof as are, and in the stage of implementation, for realization, a change can be made to a constituent element within the scope that does not depart from the gist of the invention. Furthermore, various inventions can be contemplated by suitably combining a plurality of constituent elements that are disclosed in each embodiment or the modification example thereof, which are described above. For example, among all constituent elements that are described in each embodiment or the modification example thereof, several constituent elements may be deleted. Moreover, the constituent elements that are described in the different embodiments and the modification examples thereof may be combined. Furthermore, in the specification or the drawings, the terms that are described at least once together with different terms that have broader meaning or the same meaning can be exchanged with the different terms, in any place of the specification or the drawings. In this manner, various modifications or applications are possible within the scope that does not depart from the gist of the invention.

What is claimed is:

1. A terminal apparatus that is communicatively connected to a server system that collects operation information on a printer, through a network, the apparatus comprising:
   a communication interface that receives printing time information which indicates a time to completion of printing by the printer or a printing completion time, through the network;
   a display; and
   a processor that performs processing which displays information that is based on the printing time information, on the display,
   wherein:
      the processor causes a mode for displaying the printing time information on the display to change between a first state where the reception of the printing time information from the server system through the network succeeds and a second state that is at least one of a state where the reception fails and a state where the reception is in progress,
      in the first state, the display displays a printing time information that indicates that the terminal apparatus is currently connected to the server system, and
      in the second state, the display displays a previously received printing time information that was received in a previous first state, and displays information that indicates that the terminal apparatus is not currently connected to the server system,
   wherein, in a case where, among first to N-th (N is an integer that is equal to or greater than 2) timings, the reception of the printing time information succeeds in the first timing, where the reception of the printing time information fails in the second to (N−1)-th timings, and where the reception of the printing time information succeeds in the N-th timing, the processor performs processing that displays information which is based on the printing time information, which is received at the first timing, and warning information indicating an abnormality in the connection to the server system, on the display, during a period that corresponds to the second to (N−1)-th timings, and the processor performs processing that displays information which is based on the printing time information that is received at the N-th timing, on the display and processing that sets the warning information not to be displayed, at the N-th timing.

2. The terminal apparatus according to claim 1,
   wherein in the second state, the processor performs processing that displays information that is based on the printing time information of which the reception succeeds in the first state that is earlier than the second state, on the display.

3. The terminal apparatus according to claim 2,
wherein in the second state, the processor performs processing that displays printing completion time information that is based on the printing time information of which the reception succeeds in the first state that is earlier than the second state, on the display.

4. The terminal apparatus according to claim 2,
wherein in the second state, the processor performs processing that displays information that is a remaining time to the completion of the printing, which is based on the printing time information of which the reception succeeds in the first state that is earlier than the second state, on the display.

5. The terminal apparatus according to claim 4,
wherein in the second state, the processor performs counting-down processing of the remaining-time information that is the information, which is based on clocking information from a timer, and performs processing that displays the remaining-time information that goes through the counting-down processing, on the display.

6. The terminal apparatus according to claim 1,
wherein in the second state, the processor performs processing that displays warning information indicating an abnormality in the connection to the server system, on the display.

7. The terminal apparatus according to claim 1,
wherein in the second state, the processor performs processing that displays time information which indicates a latest time at which the reception of the printing time information from the server system through the network succeeds, on the display.

8. The terminal apparatus according to claim 1,
wherein the communication interface receives printing completion time information, as the printing time information, from the server system, and the processor performs processing that displays the printing completion time information on the display or processing that displays information which is a remaining time to the completion of the printing, which is obtained based on the printing completion time information, on the display, or
wherein the communication interface receives the information that is the remaining time, as the printing time information, from the server system, and the processor performs processing that displays the information which is the remaining time, on the display or processing that displays the printing completion time information which is obtained based on the information which is the remaining time, on the display.

9. The terminal apparatus according to claim 1,
wherein the communication interface receives pieces of printing time information on a plurality of the printers through the network, and
wherein the processor performs processing that displays a display screen, within one screen of which the pieces of printing time information on the plurality of the printers are arranged, on the display.

10. The terminal apparatus according to claim 9,
wherein, among the plurality of the printers on which the pieces of printing time information are displayed, the processor performs processing that enlarges a display area for the printer on which a selection operation is performed and thus that displays detail information.

11. A non-transitory computer-readable storage medium on which a program that causes a terminal apparatus that is communicatively connected to a server system that collects operation information on at least one printer, through a network, to operate, the program causing the terminal apparatus to serve as:
a communication interface that receives printing time information which indicates a time to completion of printing by the printer or a printing completion time, through the network; and
a processor that performs processing which displays information that is based on the printing time information, on a display,
wherein:
the processor causes a mode for displaying the printing time information on the display to change between a first state where the reception of the printing time information from the server system through the network succeeds and a second state that is at least one of a state where the reception fails and a state where the reception is in progress,
in the first state, the display displays a printing time information that indicates that the terminal apparatus is currently connected to the server system, and
in the second state, the display displays a previously received printing time information that was received in a previous first state, and displays information that indicates that the terminal apparatus is not currently connected to the server system,
wherein, in a case where, among first to N-th (N is an integer that is equal to or greater than 2) timings, the reception of the printing time information succeeds in the first timing, where the reception of the printing time information fails in the second to (N−1)-th timings, and where the reception of the printing time information succeeds in the N-th timing, the processor performs processing that displays information which is based on the printing time information, which is received at the first timing, and warning information indicating an abnormality in the connection to the server system, on the display, during a period that corresponds to the second to (N−1)-th timings, and the processor performs processing that displays information which is based on the printing time information that is received at the N-th timing, on the display and processing that sets the warning information not to be displayed, at the N-th timing.

12. A method of operating a terminal apparatus that is communicatively connected to a server system that collects operation information on at least one printer, through a network, the method comprising:
performing processing that receives printing time information which indicates a time to completion of printing by the printer or a printing completion time, through the network;
performing processing that displays information which is based on the printing time information, on a display; and
causing a mode for displaying the printing time information on the display to change between a first state where the reception of the printing time information from the server system through the network succeeds and a second state that is at least one of a state where the reception fails and a state where the reception is in progress,
wherein:
in the first state, the display displays a printing time information that indicates that the terminal apparatus is currently connected to the server system, and in the second state, the display displays a previously received printing time information that was received in a previous first state, and displays information that indicates that the terminal apparatus is not currently connected to the server system, wherein, in a case where, among first to N-th (N is an integer that is equal to or greater than 2) timings, the reception of the printing time information succeeds in the first timing, where the reception of the printing time information fails in the second to (N−1)-th timings, and where the reception of the printing time information succeeds in the N-th timing, the processor performs processing that displays information which is based on the printing time information, which is received at the first timing, and warning information indicating an abnormality in the connection to the server system, on the display, during a period that corresponds to the second to (N−1)-th timings, and the processor performs processing that displays information which is based on the printing time information that is received at the N-th timing, on the display and processing that sets the warning information not to be displayed, at the N-th timing.

\* \* \* \* \*